United States Patent

Yamagata et al.

[11] Patent Number: 5,825,940
[45] Date of Patent: Oct. 20, 1998

[54] IMAGE PROCESSING METHOD AND APPARATUS FOR BINARY-CODING MULTIVALUE IMAGE DATA

[75] Inventors: Shigeo Yamagata; Hiroshi Tanioka, both of Yokohama, Japan

[73] Assignee: Canon Kabushiki Kaisha, Tokyo, Japan

[21] Appl. No.: 587,657

[22] Filed: Jan. 17, 1996

[30] Foreign Application Priority Data

| Jan. 23, 1995 | [JP] | Japan | 7-008181 |
| Jan. 23, 1995 | [JP] | Japan | 7-008182 |
| Jan. 23, 1995 | [JP] | Japan | 7-008186 |

[51] Int. Cl.$^6$ .................. G06K 9/40; G06K 9/38
[52] U.S. Cl. ............... 382/276; 382/272; 382/270
[58] Field of Search .................. 382/276, 270, 382/272; 358/448, 429, 443

[56] References Cited

U.S. PATENT DOCUMENTS

| 4,562,486 | 12/1985 | Suzuki et al. | 358/282 |
| 4,876,610 | 10/1989 | Ohsawa et al. | 358/443 |
| 4,878,125 | 10/1989 | Katayama et al. | 358/443 |
| 4,958,236 | 9/1990 | Nagashima et al. | 358/445 |
| 4,958,238 | 9/1990 | Katayama et al. | 358/456 |
| 4,975,786 | 12/1990 | Katayama et al. | 358/459 |
| 5,008,950 | 4/1991 | Katayama et al. | 382/50 |
| 5,086,484 | 2/1992 | Katayama et al. | 382/50 |
| 5,121,446 | 6/1992 | Yamada et al. | 382/50 |
| 5,121,447 | 6/1992 | Tanioka et al. | 382/50 |
| 5,130,819 | 7/1992 | Ohta | 358/445 |
| 5,153,925 | 10/1992 | Tanioka et al. | 382/52 |
| 5,157,741 | 10/1992 | Katayama | 382/54 |
| 5,436,736 | 7/1995 | Shono | 358/456 |
| 5,577,136 | 11/1996 | Tanioka et al. | 382/270 |

FOREIGN PATENT DOCUMENTS

| 57-104369 | 6/1982 | Japan | H04N 1/40 |

OTHER PUBLICATIONS

Floyd, et al., "An Adaptive Algorithm for Spatial Gray Scale", SID 75 Digest, pp. 36–37.

*Primary Examiner*—Thomas D. Lee
*Assistant Examiner*—Jerome Grant, II
*Attorney, Agent, or Firm*—Fitzpatrick, Cella, Harper & Scinto

[57] ABSTRACT

An object of the present invention is to provide an image processing apparatus capable of, at high speed, forming a half tone image exhibiting excellent linearity and gradation expressing characteristics while requiring only a simple structure. The image processing apparatus including a mean density calculating circuit for calculating a mean density in a predetermined region, a random number generator for generating random number data, an adder for adding, at a ratio corresponding to a level of input multivalue image data, the mean density obtained by said mean density calculating circuit and the random number data supplied from the random number generator, and a comparator for binary-coding the multivalue image data in such a manner that a value obtained by said adder is used as a threshold. To prevent roughness appearing in a highlight region in a binary-coded output image and obtain a satisfactory half tone output image exhibiting excellent gradation expressing characteristics, the mean density calculating circuit has a changing unit for changing the mean density.

19 Claims, 26 Drawing Sheets

FIG. 3(1)

| f(i-2, j-1) | f(i-2, j) | f(i-2, j+1) |
|---|---|---|
| f(i-1, j-1) | f(i-1, j) | f(i-1, j+1) |
| f(i, j-1) | f(i, j) | f(i, j+1) |

INPUT MULTIVALUE IMAGE

FIG. 3(2)

| B(i-2, j-1) | B(i-2, j) | B(i-2, j+1) |
|---|---|---|
| B(i-1, j-1) | B(i-1, j) | B(i-1, j+1) |
| B(i, j-1) | B(i, j) | B(i, j+1) |

BINARY-CODED IMAGE

FIG. 3(3)

| R(2, 1) | R(2, 0) | R(2, -1) |
|---|---|---|
| R(1, 1) | R(1, 0) | R(1, -1) |
| R(0, 1) | R(0, 0) | R(0, -1) |

$R(0, 0) = R(0, -1) = 0$

WEIGHTING MASK

FIG. 11(1)

| f(i-2, j-1) | f(i-2, j) | f(i-2, j+1) |
|---|---|---|
| f(i-1, j-1) | f(i-1, j) | f(i-1, j+1) |
| f(i, j-1) | f(i, j) | f(i, j+1) |
| f(i+1, j-1) | | |

INPUT MULTIVALUE IMAGE

FIG. 11(2)

| R(2, 1) | R(2, 0) | R(2, -1) |
|---|---|---|
| R(1, 1) | R(1, 0) | R(1, -1) |
| R(0, 1) | R(0, 0) | R(0, -1) |
| R(-1, 1) | R(-1, 0) | R(-1, -1) |

WEIGHTING MASK

FIG. 13(1)

| f(i-3, j-3) | f(i-3, j-2) | f(i-3, j-1) | f(i-3, j) | f(i-3, j+1) | f(i-3, j+2) | f(i-3, j+3) |
|---|---|---|---|---|---|---|
| f(i-2, j-3) | f(i-2, j-2) | f(i-2, j-1) | f(i-2, j) | f(i-2, j+1) | f(i-2, j+2) | f(i-2, j+3) |
| f(i-1, j-3) | f(i-1, j-2) | f(i-1, j-1) | f(i-1, j) | f(i-1, j+1) | f(i-1, j+2) | f(i-1, j+3) |
| f(i, j-3) | f(i, j-2) | f(i, j-1) | f(i, j) | f(i, j+1) | f(i, j+2) | f(i, j+3) |
| f(i+1, j-3) | f(i+1, j-2) | f(i+1, j-1) | | | | |

INPUT MULTIVALUE IMAGE

FIG. 13(2)

| B(i-3, j-3) | B(i-3, j-2) | B(i-3, j-1) | B(i-3, j) | B(i-3, j+1) | B(i-3, j+2) | B(i-3, j+3) |
|---|---|---|---|---|---|---|
| B(i-2, j-3) | B(i-2, j-2) | B(i-2, j-1) | B(i-2, j) | B(i-2, j+1) | B(i-2, j+2) | B(i-2, j+3) |
| B(i-1, j-3) | B(i-1, j-2) | B(i-1, j-1) | B(i-1, j) | B(i-1, j+1) | B(i-1, j+2) | B(i-1, j+3) |
| B(i, j-3) | B(i, j-2) | B(i, j-1) | B(i, j) | B(i, j+1) | B(i, j+2) | B(i, j+3) |

BINARY-CODED IMAGE

FIG. 13(3)

| R(3, 3) | R(3, 2) | R(3, 1) | R(3, 0) | R(3, -1) | R(3, -2) | R(3, -3) |
|---|---|---|---|---|---|---|
| R(2, 3) | R(2, 2) | R(2, 1) | R(2, 0) | R(2, -1) | R(2, -2) | R(2, -3) |
| R(1, 3) | R(1, 2) | R(1, 1) | R(1, 0) | R(1, -1) | R(1, -2) | R(1, -3) |
| R(0, 3) | R(0, 2) | R(0, 1) | R(0, 0) | R(0, -1) | R(0, -2) | R(0, -3) |
| R(-1, 3) | R(-1, 2) | R(-1, 1) | R(-1, 0) | R(-1, -1) | R(-1, -2) | R(-1, -3) |

WEIGHTING MASK

FIG. 13(4)

| 1 | 3 | 5 | 7 | 5 | 3 | 1 |
|---|---|---|---|---|---|---|
| 3 | 8 | 10 | 19 | 10 | 8 | 3 |
| 5 | 10 | 19 | 21 | 19 | 10 | 5 |
| 7 | 19 | 21 | 0 | 0 | 0 | 0 |
| 4 | 10 | 19 | 0 | 0 | 0 | 0 |

EXAMPLE OF WEIGHTING MASK

FIG. 15

| 1 | 4 | 8 | 18 | 10 | 4 | 1 |
|---|---|---|---|---|---|---|
| 4 | 38 | 52 | 88 | 48 | 40 | 6 |
| 10 | 44 | 88 | 90 | 88 | 42 | 10 |
| 20 | 88 | 90 | ✕ | | | |
| 8 | 32 | 60 | | | | |

✕ PIXEL OF INTEREST

| 1 | 5  | 7  | 9  | 6  | 3  | 1 |
|---|----|----|----|----|----|---|
| 3 | 10 | 14 | 18 | 13 | 10 | 5 |
| 7 | 13 | 18 | 20 | 18 | 13 | 7 |
| 9 | 18 | 20 | 0  | 0  | 0  | 0 |

FIG. 20(1)

| f(i-3, j-3) | f(i-3, j-2) | f(i-3, j-1) | f(i-3, j) | f(i-3, j+1) | f(i-3, j+2) | f(i-3, j+3) |
|---|---|---|---|---|---|---|
| f(i-2, j-3) | f(i-2, j-2) | f(i-2, j-1) | f(i-2, j) | f(i-2, j+1) | f(i-2, j+2) | f(i-2, j+3) |
| f(i-1, j-3) | f(i-1, j-2) | f(i-1, j-1) | f(i-1, j) | f(i-1, j+1) | f(i-1, j+2) | f(i-1, j+3) |
| f(i, j-3) | f(i, j-2) | f(i, j-1) | f(i, j) | f(i, j+1) | f(i, j+2) | f(i, j+3) |

INPUT MULTIVALUE IMAGE

FIG. 20(2)

| B(i-3, j-3) | B(i-3, j-2) | B(i-3, j-1) | B(i-3, j) | B(i-3, j+1) | B(i-3, j+2) | B(i-3, j+3) |
|---|---|---|---|---|---|---|
| B(i-2, j-3) | B(i-2, j-2) | B(i-2, j-1) | B(i-2, j) | B(i-2, j+1) | B(i-2, j+2) | B(i-2, j+3) |
| B(i-1, j-3) | B(i-1, j-2) | B(i-1, j-1) | B(i-1, j) | B(i-1, j+1) | B(i-1, j+2) | B(i-1, j+3) |
| B(i, j-3) | B(i, j-2) | B(i, j-1) | B(i, j) | B(i, j+1) | B(i, j+2) | B(i, j+3) |

BINARY-CODED IMAGE

FIG. 20(3)

| R(-3, -3) | R(-3, -2) | R(-3, -1) | R(-3, 0) | R(-3, 1) | R(-3, 2) | R(-3, 3) |
|---|---|---|---|---|---|---|
| R(-2, -3) | R(-2, -2) | R(-2, -1) | R(-2, 0) | R(-2, 1) | R(-2, 2) | R(-2, 3) |
| R(-1, -3) | R(-1, -2) | R(-1, -1) | R(-1, 0) | R(-1, 1) | R(-1, 2) | R(-1, 3) |
| R(0, -3) | R(0, -2) | R(0, -1) | R(0, 0) | R(0, 1) | R(0, 2) | R(0, 3) |

R(0, 0) = R(0, 1) = R(0, 2) = R(0, 3) = 0

WEIGHTING MASK

IMAGE PROCESSING METHOD AND APPARATUS FOR BINARY-CODING MULTIVALUE IMAGE DATA

BACKGROUND OF THE INVENTION

1. Field of the Invention

The present invention relates to an image processing apparatus for binary-coding multivalue image data to binary-coded image data.

2. Related Background Art

Hitherto, image data has been binary-coded in an image processing apparatus, such as a facsimile apparatus or a digital copying machine, by an error diffusion method, a mean density retention method or a mean density approximation method.

"AN ADAPTIVE ALGORITHM FOR SPATIAL GRAY SCALE", R. FLOYD & L. STEINBERG, pp. 36 and 37, SID 75DIGEST, discloses an error diffusion method having the step of binary-coding multivalue image data (converting the data to a darkest level or a lightest level) of a pixel of interest and, with predetermined weight, weighting an error between the binary-coded level and the multivalue image data, which has not been binary-coded, and adding the weighted error to pixels adjacent to the pixel of interest.

The applicant of the present invention has disclosed inventions relating to the error diffusion method in U.S. Pat. No. 4,876,610, U.S. Pat. No. 4,878,125, U.S. Pat. No. 5,008,950, U.S. Pat. No. 5,157,741, U.S. Pat. No. 4,958,236, U.S. Pat. No. 4,975,786, U.S. Pat. No. 4,958,238 and U.S. Pat. No. 5,086,484.

The mean density retention method uses data, which is adjacent to the pixel of interest and which has been binary-coded, and a coefficient corresponding to a predetermined position of the pixel to calculate a mean density around the pixel of interest. Then, the calculated mean density is used as a threshold so that image data of the pixel of interest is binary-coded. Furthermore, the difference between the data value of the pixel of interest and the obtained mean density is considered as an error taking place in the binary coding process. Therefore the difference is weighted with a predetermined weight so as to be added to data of the pixels adjacent to the pixel of interest.

The applicant of the present invention has disclosed the mean density retention method and its modification in U.S. patent application Ser. No. 476,766 (applied on Feb. 8, 1990), U.S. patent application Ser. No. 587,217 (applied on Sep. 24, 1990) and U.S. patent application Ser. No. 731,471 (applied on Jul. 17, 1991). Moreover, the applicant of the present invention has rights to the contents disclosed in U.S. Pat. No. 5,121,446, U.S. Pat. No. 5,121,447, U.S. Pat. No. 5,153,925, U.S. Pat. No. 5,130,819 and U.S. Pat. No. 5,436,736.

As disclosed in Japanese Patent Laid-Open No. 57-104369, the mean density approximation method obtains weighted mean values of adjacent pixels in the two cases where the pixel of interest is binary-coded to black and white by using data, which is adjacent to the pixel of interest and which has been binary-coded; and a mean value of the two mean values is used as a threshold to binary-code the image data of the pixel of interest.

Since both the error diffusion method and the mean density retention method are methods for correcting an error between input image data and output image data, the density of an input image can be retained in the output image. Thus, an image exhibiting excellent resolution and gradation expressing characteristics can be formed.

However, the error diffusion method involves a necessity of performing a multiplicity of two-dimensional calculations when an error between input image data and output image data is corrected. Since an excessively large quantity of calculations must be performed, there arises a problem in that the structure of the hardware cannot be simplified.

In particular, there arises a problem in that the directional properties of surrounding regions, to which error data is distributed, appear in an output image when an error between input image data and output image data is corrected.

Since the density of an input image is retained in the density of an output image due to the error correction, so-called density deviation takes place in an output image of a low-density region adjacent to a high-density region. Thus, the density of an input image sometimes cannot be reproduced. Moreover, in a case where an input image is a thin half tone line, the continuity of the thin line cannot be maintained or the thin line cannot be reproduced.

Since the mean density approximation method performs the calculations by using binary-coded data, the structure of the hardware can be simplified and a high speed process can be performed because the quantity of data, which must be processed, is very small.

However, since the mean density approximation method simply approximates the pixel of interest to the mean value of a region including the pixel of interest to perform the binary-coding, the number of gradations is limited and, thus, linearity is unsatisfactory. Moreover, peculiar low-frequency textures are generated with respect to an image having a smooth density change, thus causing the quality of the image to be deteriorated.

SUMMARY OF THE INVENTION

To overcome the foregoing problems experienced with the prior art, an object of the present invention is to provide an image processing apparatus and a method therefor which is capable of, at high speed, forming a half tone image exhibiting excellent image quality and gradation expressing characteristics while requiring only a simple structure.

To achieve the foregoing object, an image processing apparatus according to the present invention comprises: input means for inputting multivalue image data; calculating means for calculating a mean density in a predetermined region; random number generating means for generating random number data; synthesizing means for, at a predetermined ratio, synthesizing the mean density obtained from the calculating means and the random number data obtained from the random number generating means; and binary-coding means for binary-coding the multivalue image data in such a manner that the value obtained from the synthesizing means is used as a threshold.

According to the present invention, image reproducing performance equivalent to or superior to that obtainable from an error diffusion method can be realized though data in a very small quantity is required to be processed as compared with the error diffusion method. In particular, directional properties in a binary-coded output of a highlight region generated in the error diffusion method having the step of correcting an error can be prevented in the method according to the present invention with which the error correction is not performed. The influence of the random number signal, to be added, at a predetermined ratio, to the mean density calculated from a binary-coded data signal of a portion adjacent to a pixel of interest causes pixels, which output binary code "1", in the binary-coded output to be distributed in an average manner. Thus, the quality of the output image can be improved.

When input image data having a smooth density change is binary-coded, the influence of the random number signal to be added, at a predetermined ratio, to the mean density calculated from the binary-coded data signal of a portion adjacent to the pixel of interest prevents generation of peculiar textures as compared with the foregoing mean density approximation method. Thus, the gradation expression in a binary-coded output can be smoothed so that the quality of an output image is improved.

An image processing apparatus according to the present invention comprises: input means for inputting multivalue image data; calculating means for calculating a mean density in accordance with binary data of a pixel region, which has been binary-coded, and multivalue image data of a pixel region, which has not been binary-coded; random number generating means for generating random number data; forming means for forming a threshold for binary-coding in accordance with the mean density obtained from the calculating means and the random number data supplied from the random number generating means; and binary-coding means for binary-coding the multivalue image data by using the threshold supplied from the forming means.

As a result, in addition to the foregoing effects, generation of a diced pattern, which deteriorates the image quality, in a binary-coded output image with respect to half tone input image data can be prevented.

Another object of the present invention is to provide an image processing apparatus and a method therefor capable of, at high speed, forming a satisfactory half tone image exhibiting excellent linearity and gradation expressing characteristics while requiring only a very simple structure.

To achieve the foregoing object, an image processing apparatus according to the present invention comprises: input means for inputting multivalue image data; calculating means for calculating a mean density in a predetermined region; random number generating means for generating random number data; synthesizing means for, at a predetermined ratio corresponding to a level of the input multivalue image data, synthesizing the mean density obtained from the calculating means and the random number data obtained from the random number generating means; and binary-coding means for binary-coding the multivalue image data in such a manner that the value obtained from the synthesizing means is used as a threshold.

An image processing apparatus according to the present invention comprises: input means for inputting multivalue image data; conversion means for converting input/output characteristics of the input multivalue image data; calculating means for calculating a mean density in a predetermined region; random number generating means for generating random number data; synthesizing means for, at a predetermined ratio, synthesizing the mean density obtained from the calculating means and the random number data obtained from the random number generating means; and binary-coding means for binary-coding the multivalue image data converted by the conversion means in such a manner that the value obtained from the synthesizing means is used as a threshold.

Another object of the present invention is to provide an image processing apparatus and a method therefor which is capable of forming, at high speed, a satisfactory half tone image exhibiting excellent gradation expressing characteristics while requiring only a simple structure without performing error correction.

To achieve the foregoing object, an image processing apparatus according to the present invention comprises: input means for inputting multivalue image data; calculating means for calculating a mean density in a predetermined region; random number generating means for generating random number data; binary-coding means for binary-coding the multivalue image data in accordance with the mean density obtained from the calculating means and random number data obtained from the random number generating means; and changing means for changing the mean density.

According to the present invention, a satisfactory half tone image exhibiting excellent gradation expressing characteristics can be formed at high speed without performing error correction while requiring only a very simple structure.

In particular, according to the present invention, the random number is added to the mean density so that an undesirable fixed pattern is prevented. Since the means for changing the mean density is provided, the random number to be added to the mean density can be reduced. Thus, roughness occurring in a highlight region of a binary-coded output image can be prevented. Simultaneously, a satisfactory half tone image free from generation of a fixed pattern and exhibiting excellent gradation expressing characteristics can be formed.

Other objects, features and advantages of the invention will be evident from the following detailed description of the preferred embodiments described in conjunction with the attached drawings.

BRIEF DESCRIPTION OF DRAWINGS

FIGS. 3(1), 3(2), and 3(3) show, respectively, input multivalue image, binary-coded image and weighting mask for each pixel;

FIGS. 11(1) and 11(2) show, respectively, an input multivalue image of a pixel value and a weighting mask;

FIGS. 13(1), 13(2), 13(3), and 13(4) show an eighth embodiment of the present invention;

FIG. 15 shows a weighting mask for use in the ninth embodiment of the present invention;

FIGS. 20(1), 20(2), and 20(3) shows, respectively, input multivalue image, binary-coded image and weighting mask for each pixel;

DETAILED DESCRIPTION OF THE PREFERRED EMBODIMENTS

With reference to the drawings, preferred embodiments of the present invention will now be described.

Figure 1:
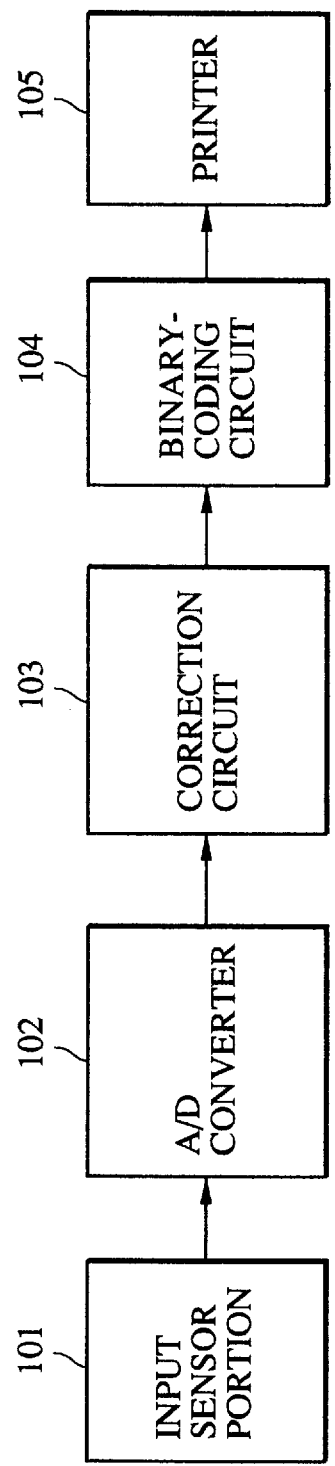
FIG. 1 is a block diagram showing the structure of an image processing apparatus commonly employed in embodiments of the present invention.

FIG. 1 is a block diagram showing the structure of an image processing apparatus for use commonly in a plurality of embodiments of the present invention.

Reference numeral 101 represents an input sensor portion having a photoelectric conversion device, such as CCD, and an operation unit for scanning the photoelectric conversion device so as to read and scan an original document. Image data items of the original document read by the input sensor portion 101 are sequentially transferred to an A/D converter 102. The A/D converter 102 converts data of each pixel to 8-bit digital data so that quantization is performed to obtain data having 256 gradations. An output signal from the A/D converter 102 is received by a correction circuit 103 so as to be subjected to shading correction for, by means of digital calculations, correcting irregular density of the CCD sensor and irregular illuminance occurring due to an irradiating light source. Then, the corrected data is supplied to a binary-coding circuit 104. In the binary-coding circuit 104, the supplied 8-bit multivalue image data is quantized to binary data, such that one bit corresponds to one pixel, by a binary-coding method to be described later in the following embodiments. Reference numeral 105 represents a laser beam printer or ink jet printer which controls turning a printing dot on/off in accordance with binary data supplied from the binary-coding circuit 104 so as to reproduce an image on recording paper.

The binary-coding circuit 104 shown in FIG. 1 will now be described in the following embodiments.

First Embodiment

A first embodiment of the present invention will now be described with reference to the drawings.

Figure 2:
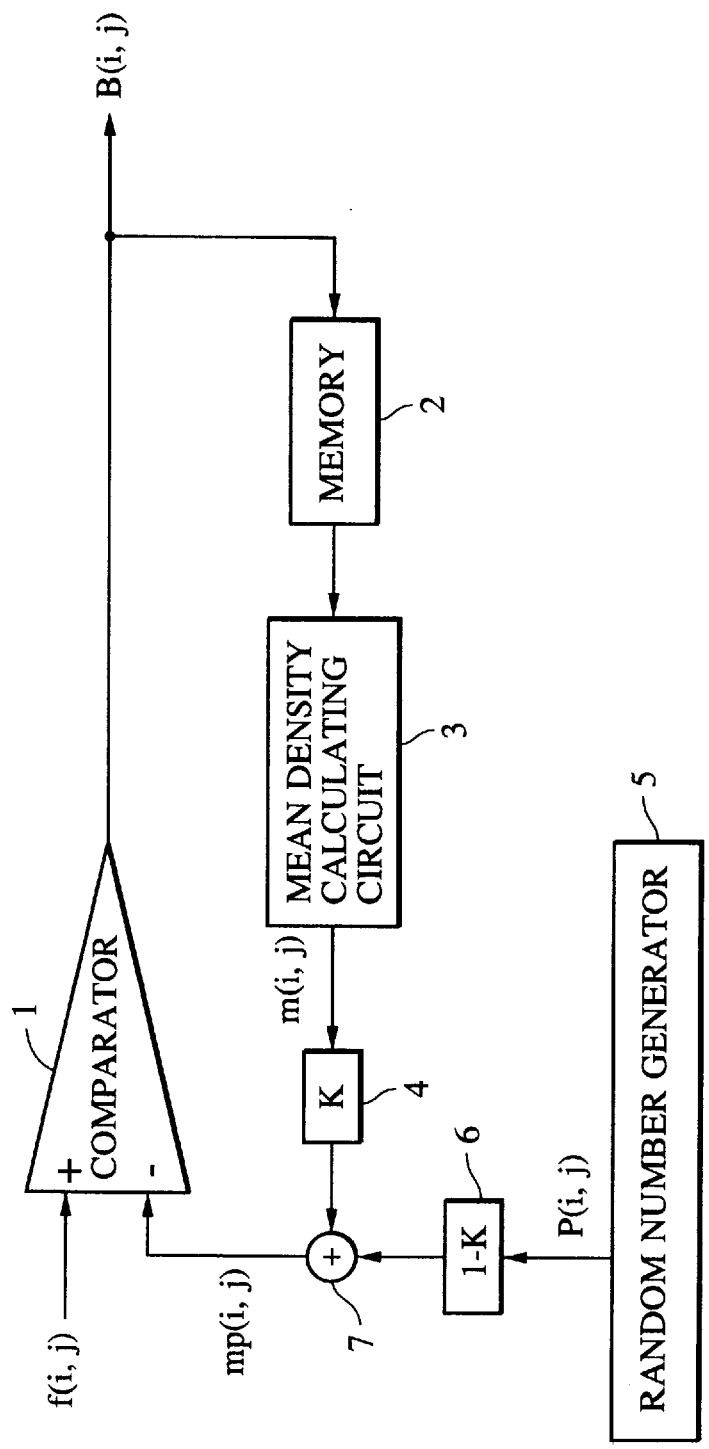
FIG. 2 is a block diagram showing a binary-coding circuit according embodiment of the present invention.

FIG. 2 shows the first embodiment of the present invention. FIG. 2 is a block diagram showing the binary-coding circuit 104. Referring to FIG. 2, f (i, j) indicates multivalue density data of an input image intended to be binary-coded, f (i, j) having a normalized value 0 to 1. Reference numeral 1 represents a comparator, to which f (i, j) and output signal mp (i, j) supplied from an adder 7, to be described later, are supplied. The comparator 1 transmits binary-coded image data B (i, j) as a result of the comparison. Reference numeral 2 represents a memory to which binary-coded output B (i, j) is supplied.

Reference numeral 3 represents a mean density calculating circuit for calculating the mean density m (i, j) adjacent to a pixel of interest in accordance with supplied binary data. Reference numeral 4 represents a multiplier which multiplies output signal m (i, j) from the mean density calculating circuit 3 by coefficient K (K is not more than 1) to transmit a result of the multiplication. Reference numeral 5 represents a random-number generator for generating random number p (i, j) having a normalized value 0 to 1. Reference numeral 6 represents a multiplier to which random number p (i, j) transmitted from the random-number generator 5 is supplied to transmit a result of multiplication of the random number p (i, j) by coefficient (1–K). Reference numeral 7 represents an adder which adds the outputs from the multiplier 4 and multiplier 6 to transmit a signal mp (i, j) indicating a result of the addition.

The output signal m (i, j) from the mean density calculating circuit 3 is, in the multiplier 4, multiplied by K, while the random number signal p (i, j) transmitted by the random-number generator 5 is, in the multiplier 6, multiplied by (1–K) and supplied to the adder 7. The output signal mp (i, j) of the adder 7 is as follows:

$$mp(i,j) = K \times m(i,j) + (1-K) \times p(i,j) \quad (1)$$

Since a number not more than 1 is selected as the coefficient K as described above, the output signal mp (i, j) is a signal indicating a result of addition of the mean density signal m (i, j) and the random number signal p (i, j) with a predetermined ratio K.

FIG. 3 (1) the configuration of input image data f (i, j) for each pixel. Referring to FIG. 3 (1), f (i, j) indicates multivalue density data of an input image of the position of the pixel of interest intended to be binary-coded.

FIG. 3 (2) shows binary-coded image data, in which B (i, j) indicates the density (a value 0 or 1) of the binary-coded pixel of interest. A portion surrounded by a dashed line indicates binary-coded pixel data when the pixel of interest is processed. The foregoing pixel data has been stored in the memory 2 shown in FIG. 2 to which a reference is made by the mean density calculating circuit 3 shown in FIG. 2 so as to calculate the mean density of a portion adjacent to the pixel of interest. FIG. 3 (3) shows a weighting mask for use in calculating the mean density, in which R is an example of the weighting mask expressed by a 3×3 matrix. The weight of the position of the pixel of interest is expressed by R (0, 0) such that R (0, 0)=R (0, –1)=0.

The operation of the first embodiment will now be described.

The memory 2 shown in FIG. 2 stores binary-coded image data, which has been binary-coded with respect to the position of the pixel of interest shown in FIG. 3 (2), such that at least a region for use in calculating the mean density by using the weighting mask shown in FIG. 3 (3) is stored.

The mean density calculating circuit 3 refers to the binary-coded image data stored in the memory 2 to obtain the mean density m (i, j) of a binary image adjacent to the pixel of interest in accordance with the following equation:

$$m(i,j) = \backslash f(1,S) \backslash i \backslash SU_{(X \times 0,2,)} \backslash i \backslash SU_{(Y=-1,1,)} R(X,Y) \times B(i-X, j-Y) \quad (2)$$

where S is total of the weights R.

The mean density m (i, j) transmitted by the mean density calculating circuit 3 is multiplied by K by the multiplier 4, and added to random number p (i, j) multiplied by (1−K) by the adder 7 so that mp (i, j) is transmitted, mp (i, j) being received by the comparator 1. In the comparator 1, mp (i, j) is subjected to a comparison with the multivalue image data f (i, j) so that binary-coded output B (i, j) is obtained in accordance with the following equations:

$$\text{if } f(i,j) > mp(i,j), \text{ then } B(i,j) = 1 \quad (3)$$

$$\text{if } f(i,j) \leq mp(i,j), \text{ then } B(i,j) = 0 \quad (4)$$

As described above, in accordance with the signal mp (i, j) indicating the result of addition, with a predetermined ratio, the multivalue input image data f (i, j), the mean density m (i, j) calculated from a binary-coded data signal adjacent to the pixel of interest and the random number signal p (i, j), the binary-coded output B (i, j) is calculated.

The value of the coefficient K for determining the addition ratio of the mean density m (i, j) calculated from the binary-coded data signal adjacent to the pixel of interest and the random number signal p (i, j) determines the smoothness of the gradation of the binary-coded output and the natural touch of a binary-coded output from a highlight region and a dark region. By reducing the value of the coefficient K and by enlarging the ratio of the random number, periodic generation of textures can be prevented. However, the obtained binary-coded output image has roughness, causing the image quality to be deteriorated. When the value of the coefficient K is about 0.7 to about 0.95, a binary-coded output free from periodic generation of textures and roughness can be obtained.

Instead of making the value of the coefficient K to be a fixed value, the value may be changed in accordance with the level of the input image data f (i, j) or that of the mean density m (i, j).

That is, as can be understood from Equation (1), when the value of the coefficient K is small, the influence of the random number considerably affects the image quality. Therefore, output dots are controlled by the random number so that an image exhibiting excellent granular touch in highlighted and dark portions is obtained. Therefore, the level of the input image data f (i, j) or that of the mean density m (i, j) is determined so that the coefficient K is made to be small in a highlighted portion having a low level and a dark portion having a high level f (i, j) or m (i, j).

Since the random number does not have a considerable effect when the value of the coefficient K is large, a smooth gradation free from roughness of the image can be expressed. Therefore, the level of the input image data f (i, j) or that of the mean density m (i, j) is determined, and the value of the coefficient K is made to be large if the determined level is in a half tone range.

The value of the coefficient K may be selectively set to correspond to the quality of the binary-coded output image desired by a user.

When the mean density m (i, j) is calculated, the pixel region, to which a reference of a binary-coded data is made, which is adjacent to the pixel of interest and which has been binary-coded, is made to be larger than the region indicated by the dashed line shown in FIG. 3 (2). Thus, the gradient of the binary-coded output image can be smoothed and an excellent output image can be obtained. Note that the pixel region is not limited to that according to this embodiment.

This embodiment has the arrangement such that the value, which is obtained by adding a value, obtained by multiplying the obtained mean density m (i, j) by K and the value mp (i, j) obtained by multiplying a random number obtained by multiplying the same by (1−K) to each other, is made to be the input for the comparator 1. However, another structure may be employed in which the multipliers 4 and 6 are omitted and total sum S' of the weighting masks for use in the case where the multipliers 4 and 6 are omitted is made to be S'=S/K by previously determining the weighting coefficient for each pixel shown in FIG. 3 (3); and, assuming that the random number generated by the random-number generator 5 is p' (i, j), the upper limit of the random number is previously determined so as to satisfy the equation p' (i, j)=(1−K)×p (i, j) and to make a value obtained by adding the total sum S' and the random number p' (i, j) to be the input for the comparator 1.

Figure 4:
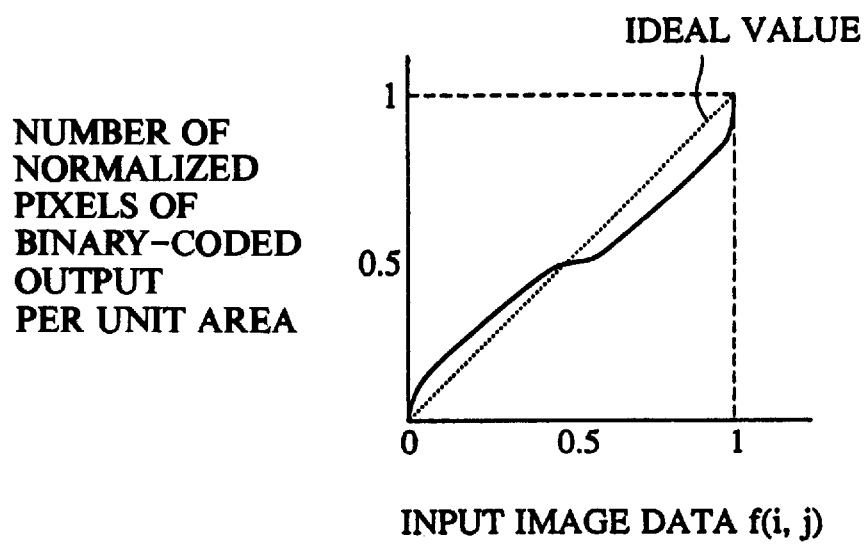
FIG. 4 shows linearity of binary-coded image data to be output from the structure according to the embodiment shown in FIG. 2.

FIG. 4 shows the linearity of binary-coded image data to be transmitted from the structure according to the embodiment shown in FIG. 2, in which the axis of the abscissa stands for multivalue image data to be supplied and the axis of the ordinate stands for the number of normalized pixels in a binary-coded output 1 per unit area.

In a case where the value of the coefficient K for determining the ratio of addition of the random number is constant, and the value of the input multivalue image data is, as shown in FIG. 4, smaller than the central value, the number of pixels in the binary-coded output 1 per unit area is larger than the ideal value. In a case where the value of the input multivalue image data is larger than the central value, the number of pixels in the binary-coded output 1 per unit area is smaller than the ideal value. Thus, a characteristic, which is symmetric with respect to the half tone level, is realized. The error from the ideal value is largest in the case where an input multivalue image data for the lowest or highest density is processed.

When a highlighted image, having a small input multivalue image data, is binary-coded, the value of the mean density m (i, j) to be calculated when a major portion of the pixel of interest is binary-coded, is a small value (a value approximating the lowest density), and the value of mp (i, j) to be subjected to a comparison in the comparator 1 is mainly controlled by the random number p (i, j) generated by the random-number generator 5. That is, the range of the values of the random number p (i, j) and the period of the same are important factors for determining the binary-coded output of a highlighted image. Because of the same reason, when a high-density image having a large input multivalue image data is binary-coded, the range of the values of the random number p (i, j) and the period of the same are important factors for determining a binary-coded output of a highlighted image.

To satisfactorily determine the linearity of a highlight or high-density image, the ratio of addition of the random numbers must be relatively high. However, a constant increase in the ratio of addition of the random numbers results in roughness of the binary-coded output image being critical and the quality of the image being deteriorated.

Figure 5:
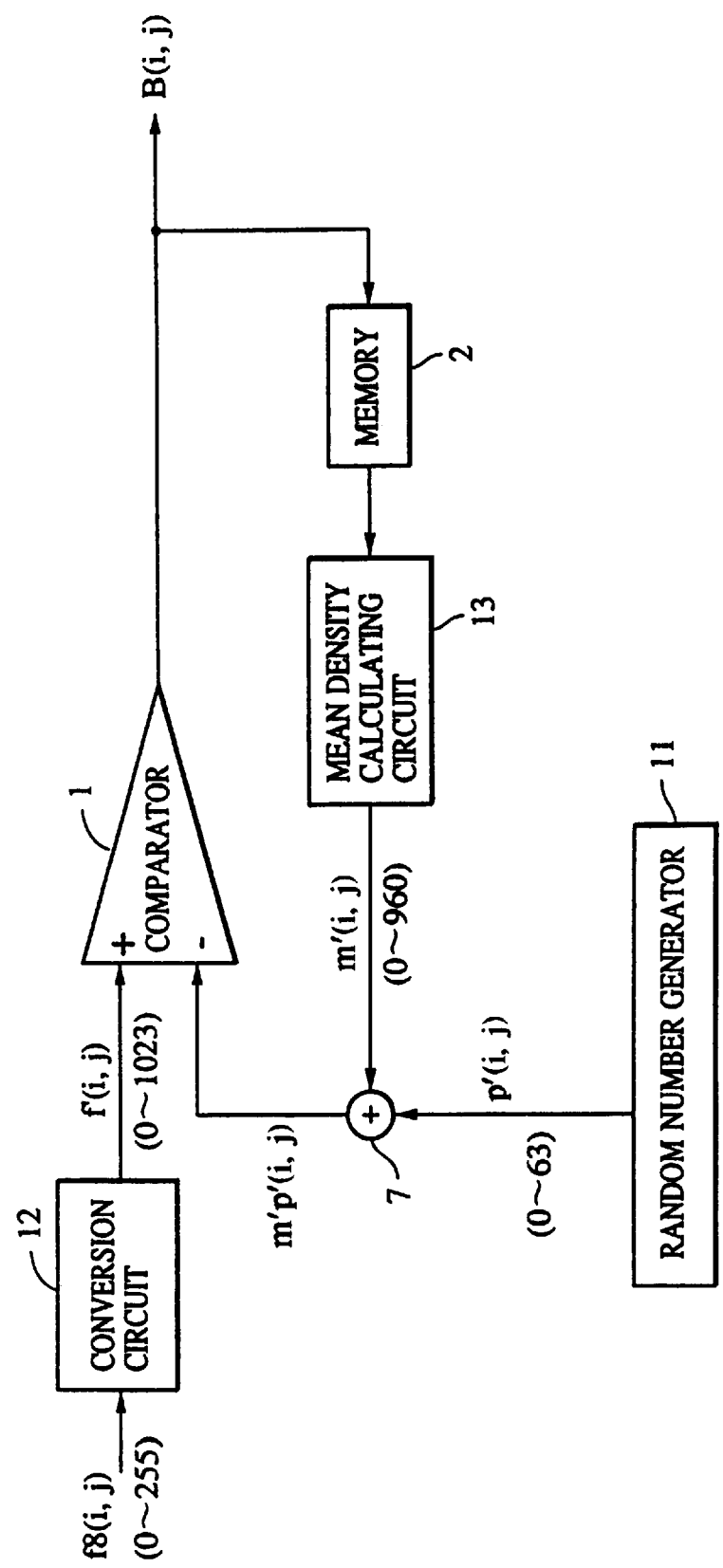
FIG. 5 is a block diagram showing a structure according to the first embodiment for improving the linearity.

Accordingly, an embodiment having a structure shown in FIG. 5 is arranged, in which the linearity of a highlighted portion is intended to be maintained satisfactorily without a necessity of increasing the ratio of addition of the random numbers.

FIG. 5 shows an example where values 0 to 255 (8 bits) are taken as the input multivalue image data. Referring to FIG. 5, reference numeral 11 represents a random number generator which generates random numbers 0 to 63. Reference numeral 12 represents a conversion circuit for table-converting 8-bit input multivalue image data f8 (i, j) into a 10-bit data signal f' (i, j), the conversion circuit 12 including a 256-byte RAM. A mean density calculating circuit 13 is a block for calculating mean density from binary-coded output data of a region surrounding a binary-coded pixel of interest. The mean density m' (i, j) is calculated in accordance with the following equation:

$$m'(i,j) = \backslash i \backslash su_{(x=0,2,)} \backslash i \backslash su_{(Y=-1,1,)} R(X,Y) \times B(i-X, j-Y)$$

where R (X, Y) and B (i–X, j–Y) each are the value of a weighting mask and binary-coded output data each of which corresponds to the position of the pixel shown in FIGS. 3 (2) and 3 (3).

To make the total sum of the weighting masks to be 960, the value corresponding to each pixel has been determined. The adder 7 is supplied with the foregoing random numbers p' (i, j) and m' (i, j). Data m'p' (i, j) obtained by adding the supplied random numbers is, in the comparator 1, subjected to a comparison with input multivalue image data f' (i, j) converted into 10-bit data so that binary-coded output B (i, j) is obtained. Since m'p' (i, j) is able to have values 0 to 1023 with respect to 0 to 255 of the input multivalue image data f8 (i, j), determination of the conversion table of the conversion circuit 12 to be an appropriate value will enable the linearity with respect to the input multivalue image data, that is, the number of pixels, with which the binary-coded output per unit area is made to be "1", to be controlled. As a result, excellent linearity can be maintained with respect to a highlight image or a high density image without the necessity of enlarging the random number to be added.

Figure 6:
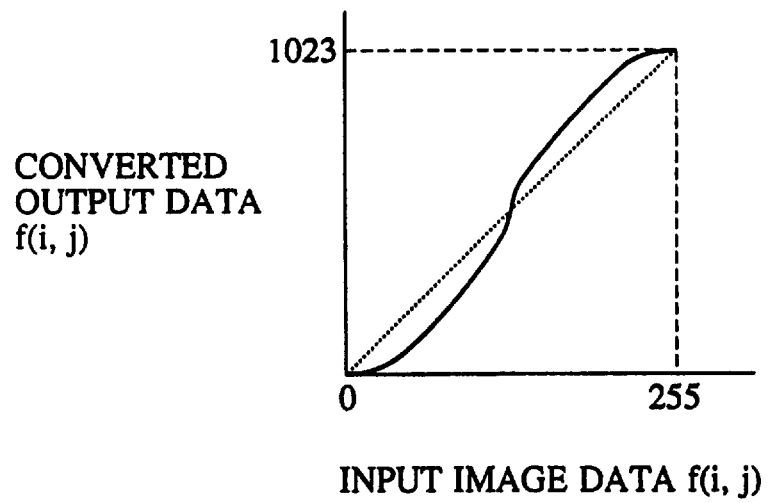
FIG. 6 shows an example of a conversion table.
Figure 7:
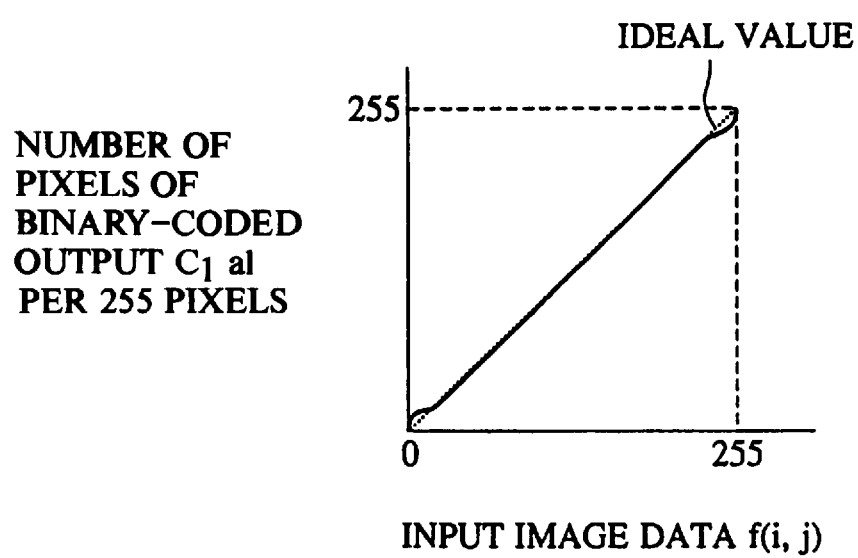
FIG. 7 shows linearity of binary-coded image data to be output from the circuit shown in FIG. 5.

FIG. 6 shows an example of the conversion table for use in the conversion circuit 12, and FIG. 7 shows the linearity of binary-coded input image data to be output from the structure according to the embodiment shown in FIG. 5. The axis of the abscissa of each of FIGS. 6 and 7 stands for multivalue image data to be supplied and the axis of the ordinate stands for the number of pixels in the binary-coded output 1 per unit area (255 pixels).

The conversion table for use in the foregoing example is set in such a manner that the number of pixels, from which the binary code "1" is output, with respect to a highlight input is decreased by performing conversion to lower the input data, that is, by performing conversion to a value smaller than a value, which is 4 times the input image data. If a high density input is performed, the number of pixels, from which the binary code "1" is output, is increased by performing conversion to raise the input data, that is, by performing the conversion to a value which is larger than a value which is 4 times the input image data.

By using the foregoing conversion table and by extending the 8-bit input data to 10-bit data, the linearity in the case where the input multivalue image data is subjected to the binary-coding process can be improved without the necessity of raising the ratio of addition of the random numbers.

The reason for this is that the value of the random number, which considerably contributes to the linearity of the input level of a highlighted image or maximum density image, can substantially be enlarged. As an example, if 0 to 15 added random numbers are required to perform an 8-bit process, a 10-bit process using 0 to 60 added random numbers results in a similar roughness in the output image. However, in the case where all of binary-coded outputs of binary-coded pixels around the pixel of interest are "0" or "1", that is, in the case of a highlighted or high-density input image in which the value of the added random numbers mainly controls the determination of the level of the binary-coded output, the width of the added random numbers is made to be four times. Thus, the ratio, at which the binary-coded outputs from the highlighted portions are made to be "1", is lowered, and the ratio, at which the binary-coded outputs from the high-density portions are made to be "0", is lowered.

Although the RAM for performing table conversion is, in this embodiment, employed in the conversion circuit, a similar effect can, of course, be obtained by performing an arithmetic calculation to convert the data signal.

As described above, the binary-coding method according to the first embodiment must process data in a very small quantity as compared with the error diffusion method but has equivalent or superior image reproducing performance. In particular, directional properties of a binary-coded output from a highlight region generated when an error diffusion method, in which error correction is performed, is employed cannot be generated in the method according to this embodiment in which the error correction is not performed. Furthermore, the influence of the random number signal added, at a predetermined ratio, to the mean density calculated from the binary-coded data signal of a portion adjacent to the pixel of interest causes pixels in the binary-code output, which output "1", to be average-distributed so that the quality of the output image is improved.

The influence of the random number signal to be added, at a predetermined ratio, to the mean density calculated from the binary-coded data signal of a portion adjacent to the pixel of interest enables generation of peculiar textures to be prevented as compared with the foregoing mean density approximation method even in a case where input image data having a smooth density change is binary-coded. As a result, gradient expression of a binary-coded output can be smoothed and the quality of the output image can be improved.

Moreover, roughness in an output image can be prevented and the linearity realized in the case where an input multivalue image is binary-coded can be improved.

Second Embodiment

Figure 8:
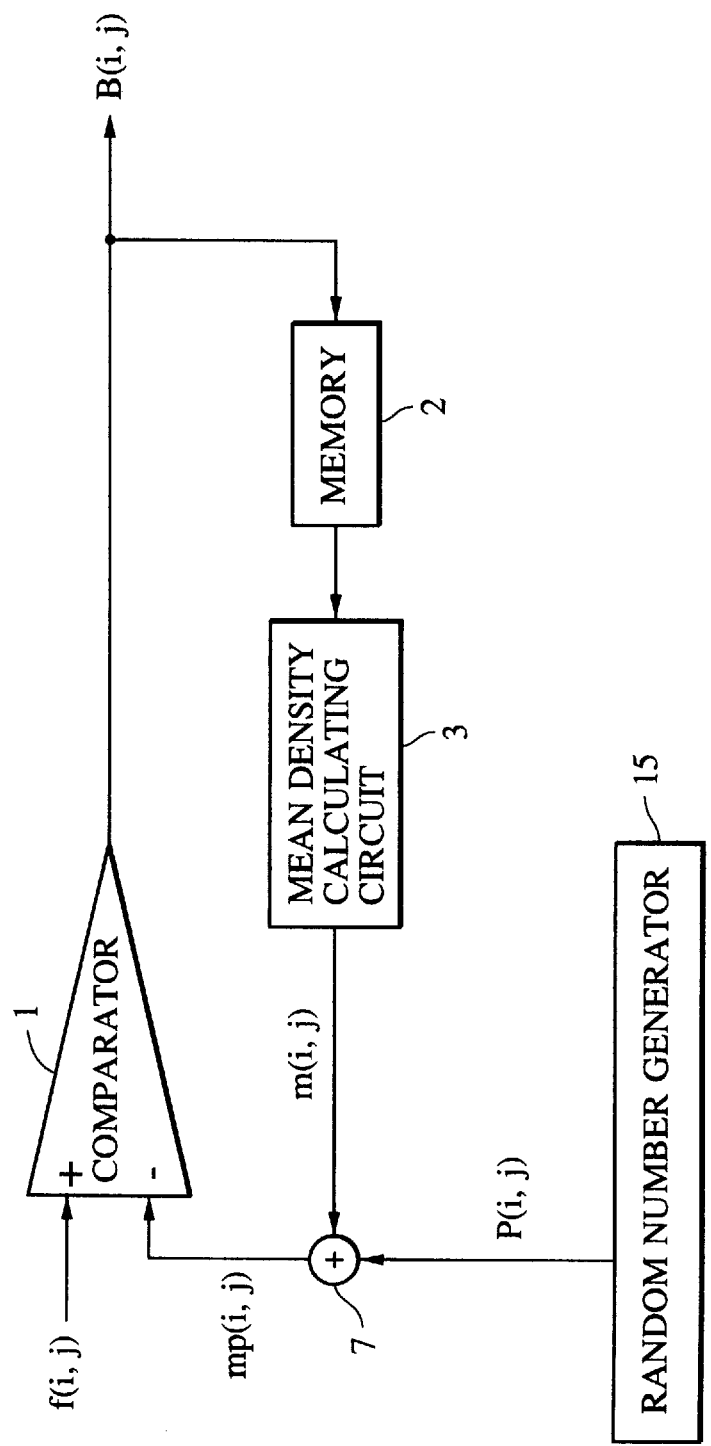
FIG. 8 is a block diagram showing a binary-coding circuit according to a second embodiment of the present invention.

FIG. 8 is a block diagram showing a second embodiment of the present invention.

Referring to FIG. 8, blocks similar to those according to the first embodiment shown in FIG. 2 are given the same reference numerals and their descriptions are omitted.

Referring to FIG. 8, reference numeral 15 represents a random number generator for generating normalized random number p (i, j) in a range from –G to +G as output signals.

The operation of the second embodiment of the present invention will now be described.

The mean density calculating circuit 3 shown in FIG. 8 transmits mean density m (i, j) calculated in accordance with Equation (2). The adder 7 adds the mean density m (i, j) to output signal p (i, j) from the random number generator 15 so that output signal mp (i, j) is generated, the output signal mp (i, j) being then subjected to a comparison with multivalue density data of an input image in the comparator 1. As a result, binary-coded output B (i, j) is obtained.

The output mp (i, j) from the adder 7 is a plus value or a minus value changed from a central value, which is the calculated mean density m (i, j).

Value G for determining the range of the random numbers to be generated by the random number generator 15 determines the smoothness of gradient in the binary-coded output and natural touch of a binary-coded output in a highlighted region. If the value of G is about 0.35 to about 0.025, a satisfactory binary-coded output can be obtained.

By using minus data as well as plus data as the random numbers, more natural output images can be obtained.

The random number generator 15 may be employed as the random-number generator 5 shown in FIG. 2 or the random number generator 11 shown in FIG. 5.

Third Embodiment

Figure 9:
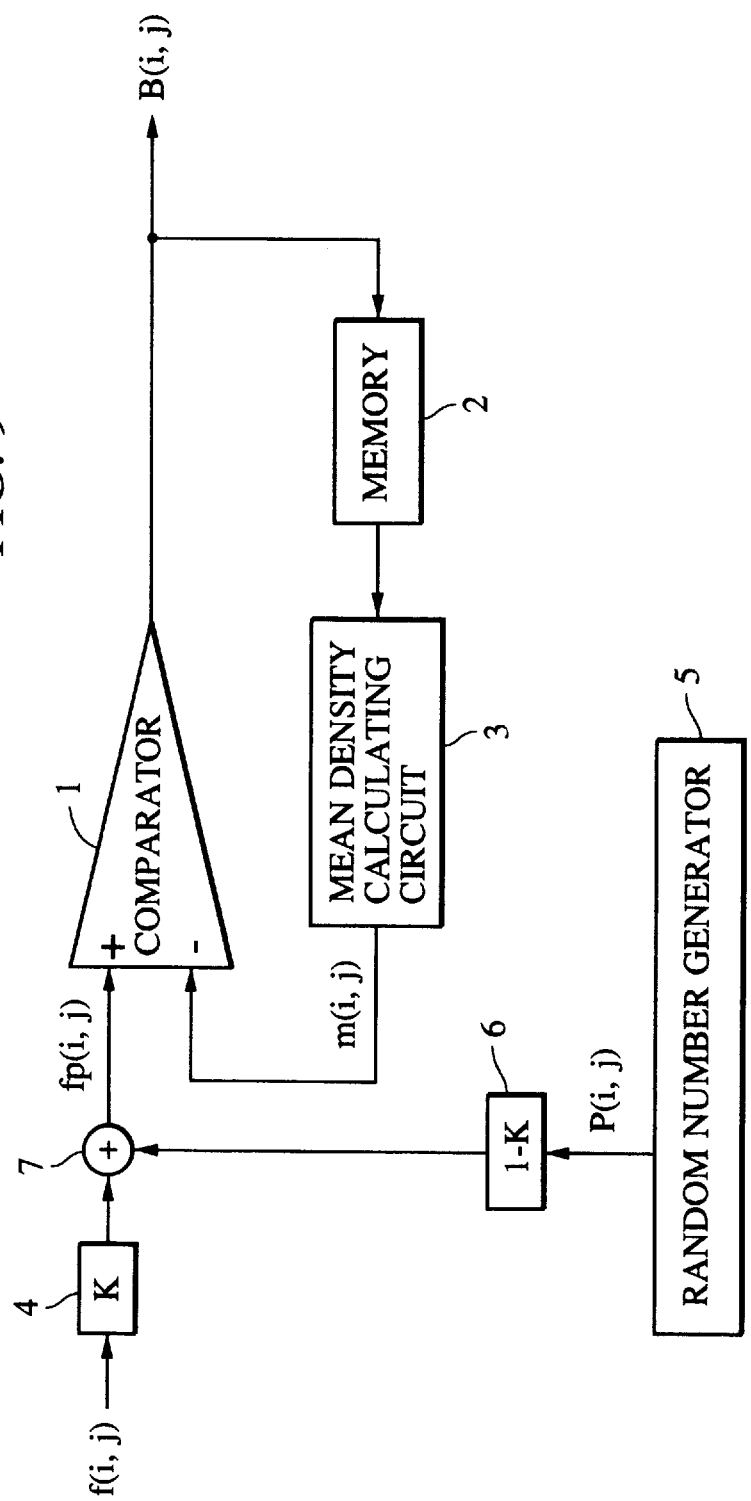
FIG. 9 is a block diagram showing a binary-coding circuit according to a third embodiment of the present invention.

FIG. 9 is a block diagram showing a third embodiment of the present invention.

Referring to FIG. 9, blocks similar to those according to the first embodiment shown in FIG. 2 are given the same reference numerals and descriptions of the similar blocks are omitted here.

The operation of the third embodiment of the present invention will now be described.

In this embodiment, input multivalue image signal f (i, j) is multiplied by K in the multiplier 4, while random number signal p transmitted from the random-number generator 5 is multiplied by (1−K) in the multiplier 6. The multiplied signals are supplied to the adder 7. Output signal fp (i, j) from the adder 7 is formed by adding, at a predetermined ratio, the input image signal f (i, j) and the random number signal p (i, j), the output signal fp (i, j) being expressed by the following equation:

$$fp(i,j) = K \times f(i,j) + (1-K) \times p(i,j)$$

The output signal fp (i, j) is supplied to the comparator 1, and another input terminal of the comparator 1 receives mean density m (i, j) of a portion adjacent to the pixel of interest calculated in accordance with Equation (2).

The comparator 1 calculates binary-coded output B (i, j) in accordance with the following equations to transmit the binary-coded output B (i, j):

If $fp(i,j) > m(i,j)$, then $B(i,j)=1$

If $fp(i,j) \leq m(i,j)$, then $B(i,j)=0$

As described above, in accordance with the signal fp (i, j) obtained by adding, at a predetermined ratio, input multi-value image data f (i, j) and the random number signal p (i, j) to each other and the mean density m (i, j) calculated from the binary-code data signal of a portion adjacent to a pixel of interest, the binary-coded output B is calculated.

The foregoing structure enables a binary-coded output image to be obtained which has equivalent quality to that obtainable from the structure according to the first embodiment shown in FIG. 2. Because of the same reason as that described above, an effect can be obtained in that a binary-coded output image can be obtained which is superior to that obtainable from the error diffusion method or the mean density approximation method.

Fourth Embodiment

A fourth embodiment of the present invention will now be described. The structure according to the fourth embodiment is the same as that shown in FIG. 2. The fourth embodiment has a structure such that the structure of the mean density calculating circuit 3 according to the first embodiment shown in FIG. 2 is changed. The other blocks are the same as those according to the foregoing embodiment, and descriptions of the same blocks are omitted.

Although the weighting mask (see FIG. 3 (3)) for use when the mean density is calculated as performed in the first embodiment has the value R (0, 0)=0 concerning the position of the pixel of interest, a case where R (0, 0)≠0 will now be described. Note that R (0,−1)=1 similar to the first embodiment.

In the fourth embodiment, the mean density of an output image from a portion adjacent to the pixel of interest in a case where the pixel of interest is binary-coded to "1" or "0" is made to be m1 (i, j) and m0 (i, j) which are obtained in accordance with the following equations:

In the case where B (i, j)=1, that is, the pixel of interest is black:

$$m1(i,j) = \backslash f(1,S) \backslash i \backslash su_{(X=0,2,)} \backslash i \backslash su_{(Y=-1,1,)} R(X,Y) \times B(i-X, j-Y)$$

In the case where B (i, j)=0, that is, the pixel of interest is white:

$$m0(i,j) = \backslash f(1,S) \backslash i \backslash su_{(X=0,2,)} \backslash i \backslash su_{(Y=-1,1,)} R(X,Y) \times B(i-X, j-Y)$$

where S is the total sum of weights R.

m (i, j) is obtained from m1 (i, j) and m0 (i, j) in accordance with the following equation:

$$m(i,j) = (m1(i,j) + m0(i,j))/2$$

The thus-obtained mean density m (i, j) is transmitted from the mean density calculating circuit 3.

m (i, j) transmitted from the mean density calculating circuit 3 is, at predetermined ratio K, added to output p (i, j) from the random-number generator 5 in accordance with the foregoing Equation (1) so that obtained mp (i, j) is supplied to the comparator 1.

mp (i, j) is, in the comparator 1, subjected to a comparison with another input signal f (i, j) so that binary-coded output B (i, j) is obtained in accordance with the following equations:

If $f(i,j) > mp(i,j)$, then $B(i,j)=1$

If $f(i,j) \leq mp(i,j)$, then $B(i,j)=0$

As described above, the mean density m (i, j) of the portion adjacent to the pixel of interest obtained in the fourth embodiment is the mean value of m1 (i, j) and m0 (i, j) obtained by predicting the binary-coded output from the pixel of interest since the value of the weighting mask corresponding to the position of the pixel is not 0.

As described above, by predicting the binary-coded output from the position of the pixel of interest and by determining the binary-coded output from the pixel of interest, textures generated in the binary-coded output image have a high frequency component. Thus, generation of low-frequency textures can be prevented.

Fifth Embodiment

Figure 10:
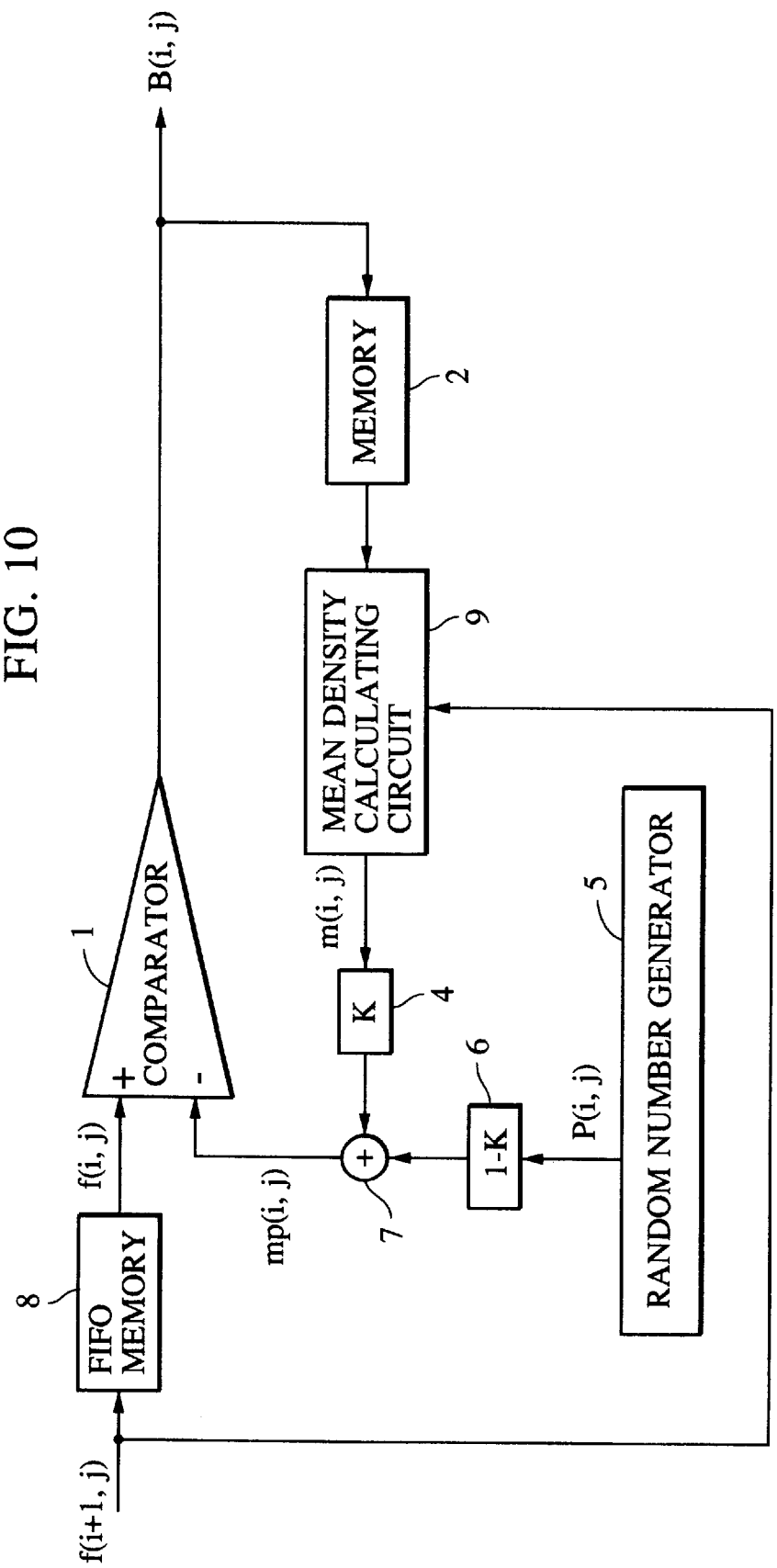
FIG. 10 is a block diagram showing a binary-coding circuit according to a fifth embodiment of the present invention.

A fifth embodiment of the present invention will now be described. FIG. 10 is a block diagram showing the fifth embodiment. Referring to FIG. 10, blocks similar to those according to the first embodiment shown in FIG. 2 are given the same reference numerals and their descriptions are omitted.

Referring to FIG. 10, reference numeral 8 represents an FIFO (First-In First-Out) memory. Input image data f (i+1, j) is supplied to the FIFO memory 8 so that the input image data f (i+1, j) is delayed by a predetermined degree.

The input image data, which has been delayed by a predetermined degree, is expressed by f (i, j) and then supplied to the comparator 1. The input image data f (i+1, j) is supplied to the mean density calculating circuit 9. Output signal m (i, j) from the mean density calculating circuit 9 is transmitted to the multiplier 4.

FIG. 11 (1) shows the configuration of input image data for each pixel. Referring to FIG. 11 (1), f (i+1, j−1) indicates input image data of pixels to be supplied to the FIFO memory 8 and the configuration of corresponding pixels. The position of a pixel indicated by input image data f (i, j) is the pixel position to which the input image data to be transmitted from the FIFO memory 8 corresponds. The pixel position f (i, j) is the pixel of interest when binary-coding is performed.

FIG. 11 (2) shows the weighting mask for use in calculating the mean density, where R is an example of the weighting mask expressed by 4×4 matrices. The weight of the position corresponding to the pixel of interest is expressed by R (0, 0) and R (0, 0)≠0 and R (0, −1)=R (−1, 0)=R (−1, −1)=0. Note that, even if R (0, 0)=0, the present invention can be realized.

The operation will now be described.

In the mean density calculating circuit 9 shown in FIG. 10, assume that the mean densities of output images from portions around the pixel of interest in the case where binary-coded output data of the binary-coded pixel supplied from the memory 2 and input image data f (i+1, j−1) are used to be binary-coded to "1" or "0" are m1 (i, j) and m0 (i, j), which are obtained from the following equations:

in the case where B (i, j)=1, that is, the pixel of interest is black, $$m1(i,j) = \backslash f(1,S) \ \{\backslash i \backslash su(X = 0,2,)\backslash i\backslash su(Y = -1,1,)R(X,Y) \times \qquad (5)$$

$$B(i - X, j - Y) + R(-1,1) \times f(i + 1, j - 1)\}$$

in the case where B (i, j)=0, that is, the pixel of interest is white, $$m0(i,j) = \backslash f(1,S) \ \{\backslash i \backslash su(X = 0,2,)\backslash i\backslash su(Y = -1,1,)R(X,Y) \times \qquad (6)$$

$$B(i - X, j - Y) + R(-1,1) \times f(i + 1, j - 1)\}$$

where S is the total sum of weights R.

By using the thus-obtained m1 (i, j) and m0 (i, j), m (i, j) is obtained from the foregoing equation:

$$m(i,j)=(m1(i,j)+m0(i,j))/2$$

The thus-obtained mean density m (i, j) is transmitted from the mean density calculating circuit 9.

As described above, the mean density m (i, j) of a portion around the pixel of interest, calculated by the mean density calculating circuit 9 according to this embodiment, is obtained by making a reference to each of the binary-coded output corresponding to the pixel adjacent the pixel of interest which has been binary-coded and input multivalue image data f (i+1, j−1) of a pixel at a position which has not been binary-coded and by performing the calculation by using the weighting mask shown in FIG. 11 (2).

The mean density m (i, j) adjacent to the pixel of interest transmitted from the mean density calculating circuit 9 is added to random number p (i, j) in accordance with the foregoing Equation (1) so that mp (i, j) is transmitted from the adder 7. In the comparator 1, mp (i, j) is subjected to a comparison with f (i, j) so that binary-coded output B (i, j) is transmitted in accordance with the foregoing Equations (3) and (4).

In the fifth embodiment, the mean density adjacent to the pixel of interest is obtained by using the binary-coded output value of a binary-coded pixel region and input image data of a pixel region, which has not been binary-coded. Thus, an effect can be obtained in which pixels, each of which transmits a binary-coded output, the level of which is "1", can be connected. Therefore, generation of textures (a diced pattern from which 1 and 0 are alternately generated) having a high frequency component in the binary-coded output image can be prevented.

The reason for this is that the mean density is not raised considerably when dots are formed in the case where input image data which has not been binary-coded is used as compared with the case where the mean density is obtained from the binary-coded output value. That is, even if a dot is formed such that the degree of rise in the mean density, which is used as the binary-coded threshold for the next pixel, is small, dots are continuously formed. As a result, if half tone image data items are continuously input, the binary-coding operation results in 1, 1, 0, 0, 1, 1, 0, 0., so that generation of an undesirable diced pattern (1, 0, 1, 0, 1, 0, . . . ) is prevented.

In the case where input image data having a smooth density change is binary-coded, periodic generation of textures can be prevented even if the ratio of addition of random numbers is lowered as compared with the method according to the first embodiment having the step of using only the binary-coded pixel region to obtain the mean density around the pixel of interest. Thus, a gradient can be expressed similar to that realized by the first embodiment and the total image quality can be improved.

Although this embodiment has the structure such that the mean density adjacent to the pixel of interest is obtained by using multivalue input image data of a pixel region, to which a reference is made and which has not been binary-coded, as shown in Equations (5) and (6), data temporarily binary-coded by dither matrix or a random number may be used. Thus, the calculations can be simplified. In the foregoing case, data binary-coded by the dither matrix is used to calculate the mean density, but the binary-coded data is not transmitted as the binary-coded output. Note that an example of the method having the step of temporarily binary-coding input multivalue data so as to be used to obtain the mean density will be described later.

By making the weighting mask for use to obtain the mean density and shown in FIG. 11 (2) to be R (0, 0)=R (0, −1)=R (−1, 0)=R (−1, −1)=0, the effect of connecting pixels from which binary-coded outputs, the level of each of which is "1", are obtained can be improved. Thus, generation of high-frequency component textures in the binary-coded output image can further be prevented. In particular, generation of diced patterns, which deteriorate the binary-coded output image with respect to input half tone image data, can be prevented.

Sixth Embodiment

A sixth embodiment of the present invention will now be described.

The sixth embodiment is characterized in that the mean density m (i, j) adjacent to a pixel of interest obtained in the mean density calculating circuit 3 shown in FIG. 2 which is the block diagram according to the first embodiment is obtained in accordance with the following equations:

$$ma(i,j)=\backslash f(1,S)\{\backslash i \backslash su_{(X=0,2,)}\backslash i\backslash su_{(Y=-1,1,)}R(X,Y)\times B(i-X,j-Y)$$

$$m(i,j)=ma(i,j)-t\{B(i,j-1)+B(i-1,j)\}$$

where $0 \leq t \leq 0.5$.

If t=0, then m (i, j) is the same as the mean density obtained in the first embodiment. By setting t to be a value larger than 0, the mean density m (i, j) to be calculated is changed in accordance with the binary-coded output values B (i−1, j) and B (i, j−1) of the pixel adjacent to the pixel of interest.

The mean density m (i, j) adjacent to the pixel of interest to be calculated is a value smaller than ma (i, j) by t {B (i, j−1)+B (i−1, j)} when each of the binary-coded output values B (i−1) and B (i, j−1) of pixels adjacent to the pixel of interest is 1. That is, if an adjacent pixel from which "1" is obtained as binary-coded output exists, the mean density is lowered in accordance with the value of the coefficient t. As a result, also the value of mp (i, j) to be supplied to the comparator 1 is reduced so that the binary-coded output B (i, j) from the comparator 1 easily has the level "1". Thus, an effect can be obtained in that pixels of level "1" to be output as a binary-coded output image can easily be connected.

By enlarging the coefficient t, pixels of level "1" to be output as a binary-coded output image can easily be connected. Thus, generation of textures having high frequency components in the binary-coded output image can be prevented. In particular, generation of diced patterns, which deteriorate the binary-coded output image with respect to input half tone image data, can be prevented.

Seventh Embodiment

A seventh embodiment of the present invention will now be described with reference to FIG. 12.

Figure 12:
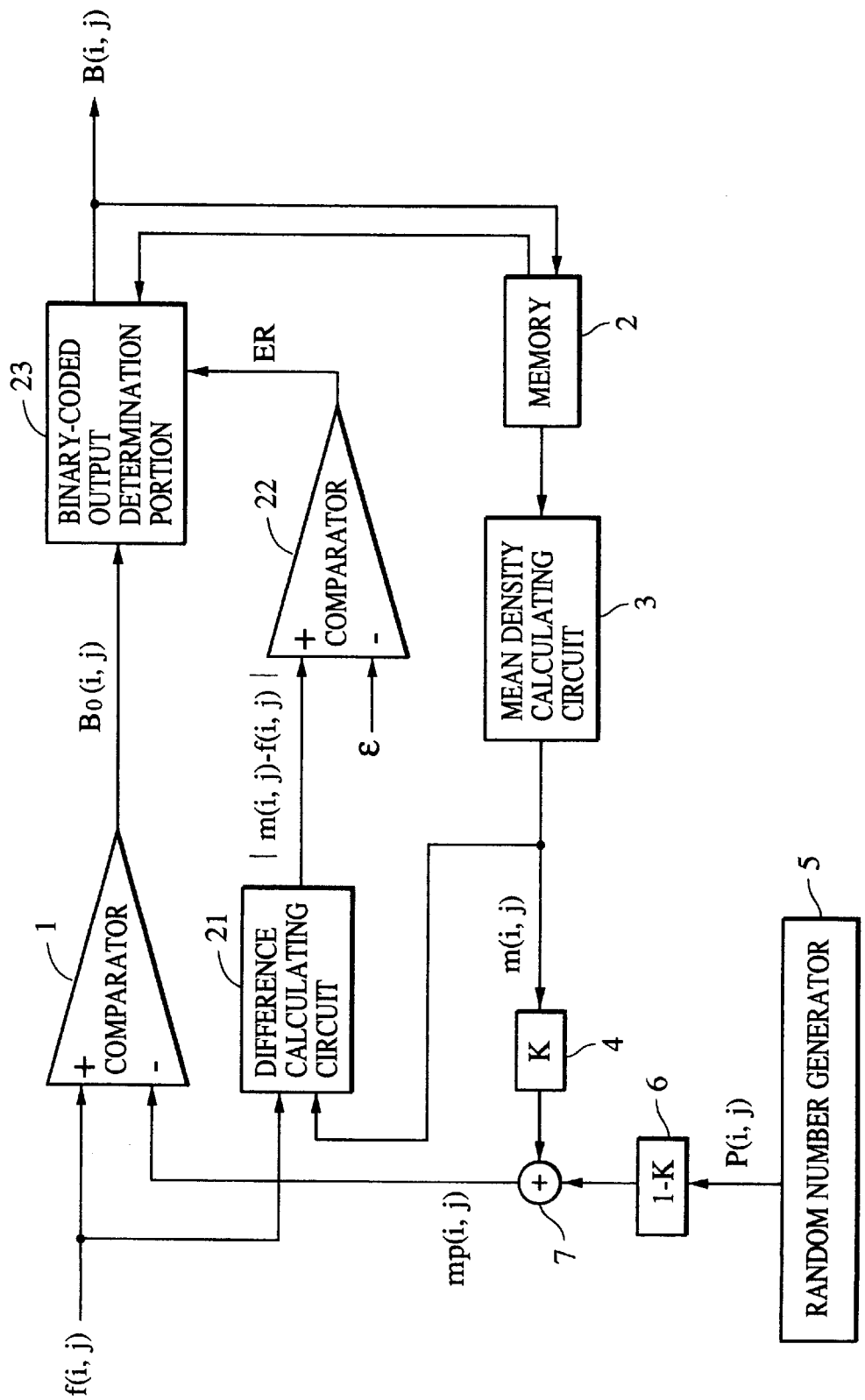
FIG. 12 is a block diagram showing a binary-coding circuit according to a seventh embodiment of the present invention.

Referring to FIG. 12, the same blocks as those according to the first embodiment shown in FIG. 2 are given the same reference numerals and they are omitted from the description.

Referring to FIG. 12, reference numeral 21 represents a difference calculating circuit to which the mean density m (i, j) adjacent to the pixel of interest, which is an output from the mean density calculating circuit 3, is supplied. The difference calculating circuit 21 transmits an output, which is an absolute value |m (i, j)−f (i, j)| which is the difference between the two inputs.

Reference numeral 22 represents a comparator for subjecting an output signal from the difference calculating circuit 21 and a predetermined value $\epsilon$ to a comparison. If |m (i, j)−f (i, j)| is larger than the predetermined value $\epsilon$, the comparator 22 transmits "1". If it is not larger than $\epsilon$, the comparator 22 transmits "0". Each of "1" and "0" is transmitted by the comparator 22 as output ER to a binary-coded output determining portion 23. The memory 2 storing signal $B_0$ (i, j) binary-coded in the comparator 1 in accordance with equations if $f(i,j) > mp(i,j)$, then $B_0(i,j)=1$ and if $f(i,j) \leq mp(i,j)$, then $B_0(i,j)=0$, the output signal ER from the comparator 22 and the binary-coded output is connected to the binary-coded output determining portion 23. The binary-coded output determining portion 23 transmits binary-coded output B (i, j).

The operation of the seventh embodiment will now be described.

The binary-coded output determining portion 23 makes a reference to the binary-coded output from the pixel adjacent to the pixel of interest shown in FIG. 3 (2) and stored in the memory 2 so that the binary-coded output determining portion 23 calculates, determines and transmits the binary-coded output B (i, j) in accordance with the following equations assuming that the number of pixels, which output "1", is N1, and that of pixels, which output "0", is N0.

If $ER=1$, then $B(i,j)=B_0(i,j)$

If $ER=0$ and $N0>N1$, then $B(i,j)=0$

If $ER=0$ and $N0 \leq N1$, then $B(i,j)=1$ where ER=1 is a case where the output signal |m (i, j)−f (i, j)| is larger than the predetermined value $\epsilon$, the case being a case where the difference between the input image data f (i, j) of the pixel of interest and the mean density m (i, j) adjacent to the pixel of interest is large. That is, in the foregoing case, a discrimination is performed that the subject portion is an edge portion of the image and the output signal from the comparator 1 is as it is transmitted as the binary-coded output B (i, j).

In the case where ER=0, that is, in the case where the difference between the input image data f (i, j) of the pixel of interest and the mean density m (i, j) adjacent to the pixel of interest is small, the binary-coded output B (i, j) is made to be 0 if the number N0 of pixels, which output "0", is larger than the number N1 of pixels, which output "1", and the binary-coded output B is made to be "1" if N0 is not larger than N1, regardless of the value of the binary-coded output $B_0$ (i, j) from the comparator 1. That is, in the case where ER=0, the binary-coded output is determined in accordance with the result of the majority decision of the binary-coded outputs from the pixel adjacent to the pixel of interest.

As described above, in the binary-coded output image, if the difference between the input image data f (i, j) of the pixel of interest and the mean density m (i, j) adjacent to the pixel of interest is small, the binary-coded output from the pixel of interest is determined in accordance with the result of the majority decision. As a result, an effect can be obtained in that a binary-coded output image with respect to input image data having a small density change can easily be output in such a manner that the same level pixels are connected. Thus, generation of high-frequency component textures can be prevented. In particular, generation of diced patterns, which deteriorate the binary-coded output image with respect to input half tone image data, can be prevented.

Eighth Embodiment

An eighth embodiment has a structure having the step of obtaining the mean density by using the binary-coded output value of a binary-coded pixel region and input image data of a pixel region, which has not been binary-coded, as described in the fifth embodiment. The blocks for performing the binary-coding process according to the eighth embodiment are the same as those according to the fifth embodiment shown in FIG. 10.

FIG. 13 (1) shows the configuration of input image data f (i, j) for each pixel. Referring to FIG. 13 (1), f (i, j) indicates multivalue density data of an input image at the position of the pixel of interest intended to be binary-coded.

FIG. 13 (2) shows binary-coded image data, in which B (i, j) indicates the density (0 or 1) of a binary-coded pixel of interest. A portion surrounded by a dashed line indicates binary-coded pixel data when a pixel of interest is processed. The foregoing data is stored in the memory 2 shown in FIG. 10 so that reference to the stored data is made in the mean density calculating circuit 9 shown in FIG. 10 so as to be used to obtain the mean density adjacent to the pixel of interest. FIG. 13 (3) shows a weighting mask for use to obtain the mean density. Referring to FIG. 13 (3), R indicates an example of the weighting mask expressed by a 5×7 matrix, and the weight of the position corresponding to the pixel of interest is indicated by R (0, 0). FIG. 13 (4) shows specific values of pixel positions to which the weighting mask data items shown in FIG. 13 (3) correspond. The value of the weighting mask is determined such that the weighting mask (R (0, 0)) corresponding to the position of the binary-coded pixel of interest is made to be 0. Moreover, the values of the weighting masks which correspond to the pixels which have not been binary-coded are made to be R (−1, 3)=4, R (−1, 2)=10 and R (−1, 1)=19. The total sum of the weighting mask are determined to be 255 so as to correspond to the fact that the input image data is an 8-bit digital signal. The mean density m (i, j) adjacent to the pixel of interest is obtained by the following equations:

$$mb(i,j) = \sum_{(X=0,3,)} \sum_{(Y=-3,3,)} R(X,Y) \times B(i-X, j-Y) \quad (7)$$

$$mc(i,j) = \sum f(1,255) \sum_{(Y=-3,3,)}(-1,Y) \times f(i+1, j-Y) \quad (8)$$

$$m(i,j) = mb(i,j) + mc(i,j) \quad (9)$$

where mb (i, j) is the density calculated from the binary-coded output value of the binary-coded pixel adjacent to the pixel of interest, mc (i, j) is the density calculated from the 8-bit multivalue input data of the pixel adjacent to the pixel of interest which has not been binary-coded, and the mean density m (i, j) adjacent to the pixel of interest to be calculated is the sum of mb (i, j) and mc (i, j) as shown in Equation (9).

As described above, the mean density m (i, j) adjacent to the pixel of interest is, at a predetermined ratio, added to the random number p (i, j) transmitted from the random-number generator 5. In this embodiment, the coefficient K is 0.95 for determining the addition ratio. The thus-obtained mp (i, j) is, in the comparator 1, subjected to a comparison with 8-bit input image data f (i, j), so that binary-coded output B (i, j) is obtained in accordance with the foregoing Equations (3) and (4).

An output image is, in this embodiment, obtained in such a manner that the value of the weighting mask corresponding to the pixel of interest to be binary-coded for use to calculate the mean density is made to be 0. Moreover, multivalue data of a pixel which has not been binary-coded is used when the mean density is obtained. Thus, by using the pixel position, which has not been binary-coded, and data of the binary-coded pixel position are used to obtain the mean density adjacent to the pixel of interest. As a result, in an image reproduced in accordance with the binary-coded output value, generation of high frequency textures can be prevented and pixels reproduced at the level 1 (the maximum density) can be connected. In particular, generation of diced patterns, which deteriorate the binary-coded output image with respect to input half tone image data, can be prevented. Therefore, the image reproducing characteristic can be improved so that an excellent half tone image is obtained.

Ninth Embodiment

Figure 14:
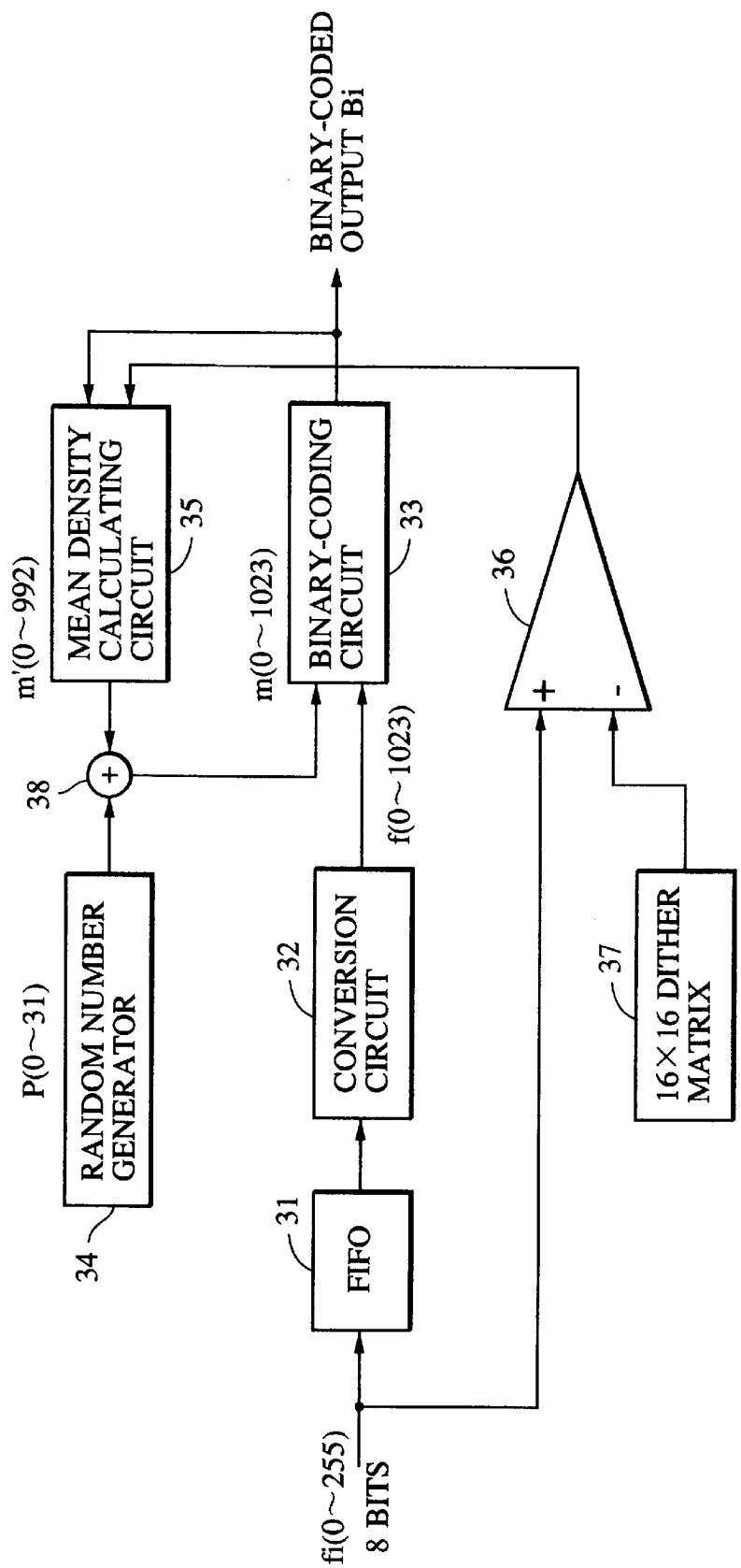
FIG. 14 is a block diagram showing a binary-coding circuit according to a ninth embodiment of the present invention.

A block diagram of a ninth embodiment is shown in FIG. 14.

The ninth embodiment is characterized in that the structure according to the first embodiment having the step of adding the random number to the mean density, and the structure as well as according to the first embodiment having the structure for improving the linearity in a highlight image region and the high density region and the structure according to the fifth embodiment having the step of obtaining the mean density in such a manner that binary-coded data and data, which has not been binary-coded, and which is binary-coded by using the dither matrix, are used.

Referring to FIG. 14, input multivalue image data fi has a value ranging from 0 to 255 (8 bits). An FIFO 31 corresponds to the FIFO 8 shown in FIG. 10. A random number generator 34 generates random numbers 0 to 31. A conversion circuit 32 is a conversion circuit for table-converting 8-bit input multivalue image data into 10-bit data, the conversion circuit 32 being including a 256-byte RAM. The conversion circuit 32 converts data as shown in FIG. 6 so that the linearity in a highlight region and a high-density region in the case where a multivalue input image is binary-coded is improved.

The mean density calculating circuit 35 uses weighting masks shown in FIG. 15 to obtain the mean density. The mean density calculating circuit 35 is supplied with a threshold from a 16×16 dither matrix 37 and binary data, which is a result of comparison performed in a comparator 36. In the mean density calculating circuit 35, the binary-coded data and binary data supplied from the comparator 36 are used to obtain the mean density by using the weighting masks shown in FIG. 15. The total sum of the weighting masks shown in FIG. 15 is 992. The mean density calculating circuit 35 transmits the mean density of 0 to 992 in accordance with the supplied binary data.

As a result, dots can be continued by a simple calculation. In particular, generation of diced patterns in a half tone portion can be prevented.

A random number supplied from the random number generator 34 is, in an adder 38, added to the output from the mean density calculating circuit 35.

A binary-coding circuit 33 uses the output from the adder 38 to binary-code the multivalue image data supplied from the conversion circuit 32.

As described above, the binary-coding method according to the ninth embodiment enables an image reproducing which is performance equivalent or superior to that obtainable from the error diffusion method to be obtained though the quantity of data to be processed is very small. In particular, the directional properties of the binary-coded output in the highlight region experienced with the error diffusion method can be prevented by the method according to this embodiment. The influences of the random numbers, at a predetermined ratio, added to the mean density adjacent to a pixel of interest and obtained from the binary-coded data signal, cause pixels, which output "1", in the binary-coded output, to be disposed in an averaged manner so that the quality of an output image is improved.

The influences of random numbers, at a predetermined ratio, added to the mean density adjacent to a pixel of interest and obtained from the binary-coded data signal, as compared with the foregoing mean density approximation method, prevent generation of peculiar textures when input image data having a smooth density change is binary-coded. Thus, the gradient image in a binary-coded output can be smoothed so that the quality of an output image is improved.

Moreover, roughness in an output image can be prevented and the linearity in the case where input multivalue image is binary-coded can be improved.

By using the data obtained by binary-coding multivalue data into binary data by using a dither threshold to obtain the mean density, generation of diced patterns, which deteriorate the binary-coded output image with respect to input half tone image data, can be prevented.

In the first to ninth embodiments, one kind (one color) input multivalue image data to be binary-coded has been described. By using R, G and B input multivalue image data or C, M, Y and K input multivalue image data, the present invention can be employed to process a color image.

The random number p (i, j), the mean density m (i, j) adjacent to a pixel of interest and the coefficient K for determining the addition ratio of the input image data f (i, j) are not limited to the foregoing values in the embodiments.

The configuration of binary-coded pixels, the number of pixels, positions of pixels, configuration and the number of pixels of an input image, which has not been binary-coded, to which a reference is made when the mean density m (i, j) adjacent to a pixel of interest is obtained, are not limited to those according to the foregoing embodiments.

Tenth Embodiment

Figure 16:
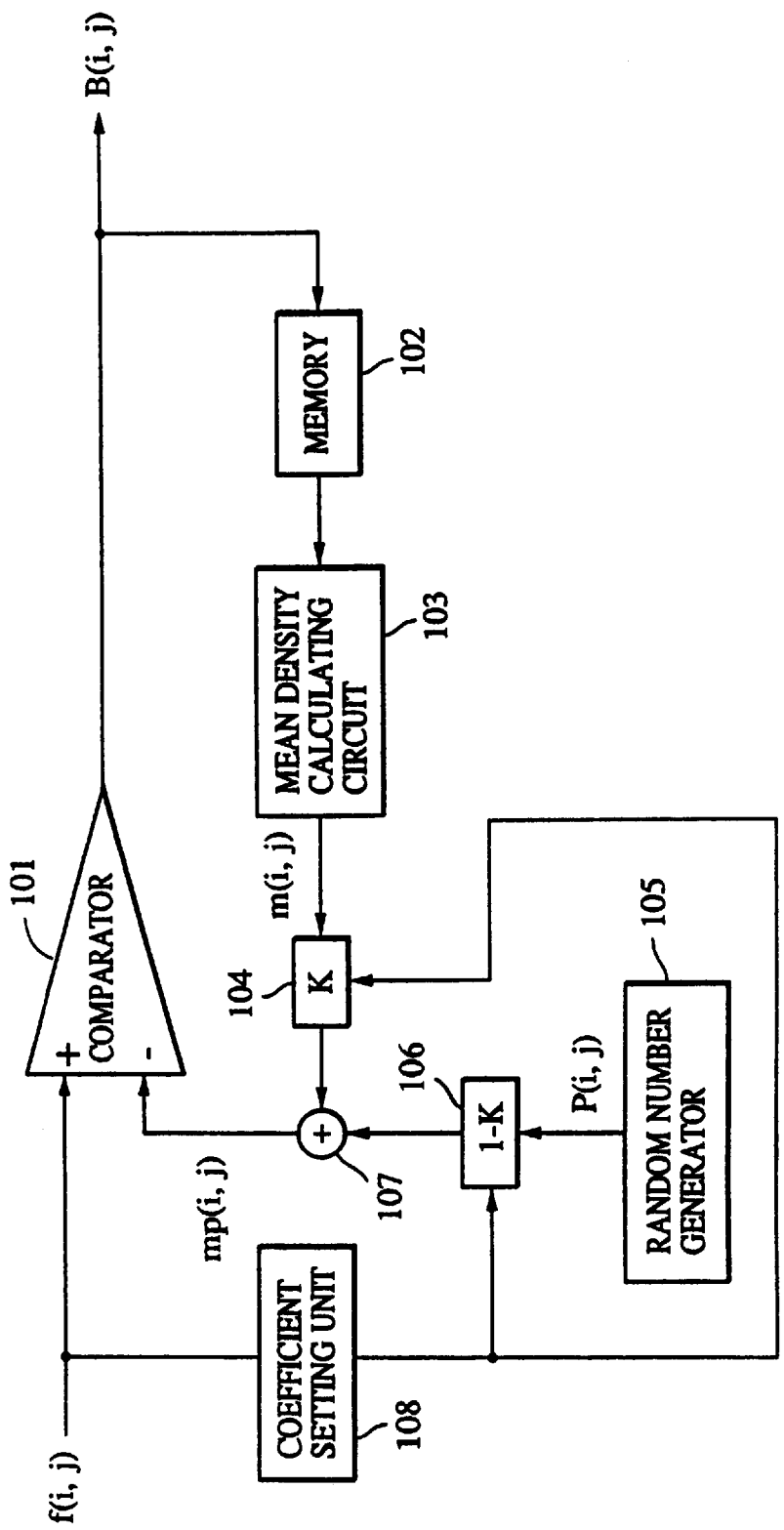
FIG. 16 is a block diagram showing a binary-coding circuit according to a tenth embodiment of the present invention.

FIG. 16 is a block diagram showing a binary-coding circuit 104 (See FIG. 1) according to a tenth embodiment of the present invention. Referring to FIG. 16, f (i, j) is multivalue density data of an input image intended to be binary-coded, f (i, j) having a value 0 to 1 of which 0 indicates the lowest density and 1 indicates the highest density. Reference numeral 101 represents a comparator which receives f (i, j) and outputs signal mp (i, j) from an adder 107 to be described later. The comparator 101 transmits binary-coded image data B (i, j) as a result of a comparison. Reference numeral 102 represents a memory which receives the binary-coded output B (i, j).

Reference numeral 103 represents a mean density calculating circuit which receives a signal read from the memory 102, and obtains and transmits the mean density m (i, j) adjacent to a pixel of interest in accordance with the supplied binary data. Reference numeral 104 represents a multiplier for multiplying output signal m (i, j) from the mean density calculating circuit 103 by coefficient K (K is not more than 1) so as to transmit the result of the multiplying process. Reference numeral 105 represents a random number generator for generating random number p (i, j) having a normalized value 0 to 1. Reference numeral 106 represents a multiplier which receives the random number p (i, j) from the random number generator 105 to transmit a result of multiplying by coefficient (1−K). Reference numeral 107 represents a adder for adding the outputs from the multiplier 104 and multiplier 106 to each other to transmit an addition result signal mp (i, j).

The output signal m (i, j) from the mean density calculating circuit 103 is, in the multiplier 104, multiplied by K and the output signal p (i, j) from the random number generator 105 is, in the multiplier 106, multiplied by (1−K) so as to be supplied to the adder 107. The output signal mp (i, j) from the adder 107 is as follows:

$$mp(i,j) = K \times m(i,j) + (1-K) \times p(i,j) \quad (10)$$

Since the coefficient K is determined to be 1 or less as described above, mp (i, j) is a signal obtained by adding the mean density signal m (i, j) and the random number signal p (i, j) at the predetermined ratio K.

Referring back to FIG. 3, the description will be performed.

FIG. 3 (1) shows the configuration of input image data f (i, j) for each pixel. Referring to FIG. 3 (1), f (i, j) indicates multivalue density data of an input image at the position of a pixel of interest intended to be binary-coded.

FIG. 3 (2) shows binary-coded image data, in which B (i, j) indicates the density (0 or 1) of a binary-coded pixel of interest. A portion surrounded by a dashed line indicates binary-coded pixel data when the pixel of interest is processed. The foregoing pixel data has been stored in the memory 2 shown in FIG. 2 to which a reference is made by the mean density calculating circuit 3 shown in FIG. 2 so as to calculate the mean density of a portion adjacent to the pixel of interest. FIG. 3 (3) shows a weighting mask for use in calculating the mean density, in which R is an example of the weighting mask expressed by a matrix 3×3. The weight of the position of the pixel of interest is expressed by R (0, 0) such that R (0, 0)=R (0, −1)=0.

The operation of this embodiment will now be described.

A memory 102 shown in FIG. 16 stores binary-coded image data, which has been binary-coded with respect to the position of the pixel of interest shown in FIG. 3 (2), such that at least a region for use in calculating the mean density by using the weighting mask shown in FIG. 3 (3) is stored.

A mean density calculating circuit 103 refers to the binary-coded image data stored in the memory 102 to obtain the mean density m (i, j) of a binary image adjacent to the pixel of interest in accordance with the following equation:

$$m(i,j) = \backslash f(1,S) \backslash i \backslash SU_{(X=0,2,)} \backslash i \backslash SU_{(Y=-1,1,)} R(X,Y) \times B(i-X, j-Y) \quad (11)$$

where S is total of the weights R.

The mean density m (i, j) transmitted by the mean density calculating circuit 103 is multiplied by K by a multiplier 104, and added to random number p (i, j) multiplied by (1−K) by an adder 107 so that mp (i, j) is transmitted. The mp (i, j) is received by a comparator 101. In the comparator 101, mp (i, j) is subjected to a comparison with the multivalue image data f (i, j) so that binary-coded output B (i, j) is obtained in accordance with the following equations:

$$\text{if } f(i,j) > mp(i,j) \text{ or if } f(i,j)=1, \text{ then } B(i,j)=1 \quad (12)$$

$$\text{if } f(i,j) \leq mp(i,j), \text{ then } B(i,j)=0 \quad (13)$$

As described above, in accordance with the signal mp (i, j) indicating the result of addition, with a predetermined ratio, the multivalue input image data f (i, j), the mean density m (i, j) calculated from a binary-coded data signal adjacent to the pixel of interest and the random number signal p (i, j), the binary-coded output B (i, j) is calculated.

The value of the coefficient K for determining the addition ratio of the mean density m (i, j) calculated from the binary-coded data signal adjacent to the pixel of interest and the random number signal p (i, j) determines the smoothness and highlight of the gradation of the binary-coded output and natural touch of a binary-coded output of a dark region. By reducing the value of the coefficient K and by enlarging the ratio of the random number, periodic generation of textures can be prevented. However, the obtained binary-coded output image has roughness, causing the image quality to be deteriorated. When the value of the coefficient K is about 0.7 to about 0.95, a binary-coded output free from periodic generation of textures and roughness can be obtained. The foregoing structure is the same as that according to the first embodiment.

As shown in FIG. 16, the structure according to this embodiment has a coefficient setting unit 108. The coefficient setting unit 108 sets the value of the coefficient K in accordance with the level of input multivalue image data. Then, the method of setting the coefficient K will now be described.

FIG. 4 shows the linearity of binary-coded image data to be transmitted from the structure according to the first embodiment, which does not comprise the coefficient setting unit 108, in which the axis of the abscissa stands for multivalue image data to be supplied and the axis of the ordinate stands for the number of normalized pixels in a binary-coded output 1 per unit area.

In a case where the value of the coefficient K for determining the ratio of addition of the random number is constant, and the value of the input multivalue image data is, as shown in FIG. 4, smaller than the central value, the number of pixels in the binary-coded output 1 per unit area is larger than the ideal value. In a case where the value of the input multivalue image data is larger than the central value, the number of pixels in the binary-coded output 1 per unit area is smaller than the ideal value. Thus, a characteristic, which is symmetric with respect to the half tone level, is realized. The error from the ideal value is largest in the case where input multivalue image data for the lowest or highest density is processed.

When a highlighted image, having a small input multivalue image data, is binary-coded, the value of the mean density m (i, j) to be calculated when a major portion of the pixel of interest is binary-coded, is a small value (a value approximating the lowest density) and the value of mp (i, j) to be subjected to a comparison in the comparator 1 is mainly controlled by the random number p (i, j) generated by the random-number generator 105. That is, the range of the values of a random number p (i, j) and the period of the same are important factors for determining the binary-coded output of a highlighted image. Because of the same reason, when a high-density image having a large input multivalue image data is binary-coded, the range of the values of the random number p (i, j) and the period of the same are important factors for determining a binary-coded output of a highlighted image. To satisfactorily cause the linearity of a highlight or high-density image to approximate the ideal value, the ratio of addition of the random numbers must be relatively high.

However, a constant increase in the ratio of addition of the random numbers results in roughness of the binary-coded output image being critical and the quality of the image being deteriorated. To overcome the foregoing problem, the coefficient setting unit 108 according to this embodiment determines the density of input image data to increase the ratio of addition of the random number, that is, enlarge the value of K, if the density of the input image data approximates the lowest density or the highest density with which a maximum error occurs with respect to the ideal value. That is, if half tone data is input, the coefficient setting unit 108 enlarges K. If the density approximates from the half tone to the highest density or if the same approximates from the half tone to the lowest density, the coefficient setting unit 108 reduces K. As a result, the ratio of addition of the random number in the half tone region is limited so that the linearity in the highest density or the lowest density is efficiently improved.

As described above, the binary-coding method according to the tenth embodiment must process data in a very small quantity as compared with the error diffusion method, but has equivalent or superior image reproducing performance. In particular, directional property of a binary-coded output from a highlight region generating when an error diffusion method, in which error correction is performed, is employed cannot be generated in the method according to this embodiment in which the error correction is not performed. Furthermore, the influence of the random number signal added, at a predetermined ratio, to the mean density calculated from the binary-coded data signal of a portion adjacent to the pixel of interest causes pixels in the binary-code output, which output "1", to be average-distributed so that the quality of the output image is improved.

The influence of the random number signal to be added, at a predetermined ratio, to the mean density calculated from the binary-coded data signal of a portion adjacent to the pixel of interest enables generation of peculiar textures to be prevented as compared with the foregoing mean density approximation method even in a case where input image data having a smooth density change is binary-coded. As a result, gradient expression of a binary-coded output can be smoothed and the quality of the output image can be improved.

By quantizing data of the pixel of interest in accordance with data obtained by, at a predetermined ratio determined in accordance with data of the pixel of interest, adding the mean density and data of the random number to each other, the half tone process can be performed at high speed which exhibits excellent linearity and gradient characteristics in such a manner that a very simple structure is required.

By enlarging, over the region indicated by a dashed line shown in FIG. 3 (2), the binary-coded pixel region adjacent to the pixel of interest, to which a reference of binary-coded data is made when the mean density m (i, j) is obtained, a smooth gradation can be obtained in the binary-coded output image so that an excellent image output is obtained. Note that the region is not limited to that according to the tenth embodiment.

Although the tenth embodiment has the structure such that the value mp (i, j) obtained by adding the value obtained by multiplying the obtained mean density m (i, j) by K and the random number obtained by multiplying the mean density m (i, j) by (1−K) to each other as the input for the comparator 1, the multipliers 104 and 106 may be omitted. The structure in the foregoing case will now be described. Total sum S' of the weighting masks in the case where the multipliers 104 and 106 are omitted is made to be as follows:

$$S'=S/K$$

by previously determining the weighting coefficient for each pixel shown in FIG. 3 (3). Moreover, assuming that the random number generated by the random number generator 105 is p' (i, j), the upper limit of the random number is previously determined to realize the following relationship:

$$p'(i,j)=(1-K) \times p(i,j)$$

Then, a value obtained by adding S' and p' (i, j) is, as mp (i, j), made to be the input for the comparator 101.

Eleventh Embodiment

Another embodiment capable of obtaining excellent linearity while preventing an increase in the ratio of the addition of the random number will now be described with reference to FIG. 17.

Figure 17:
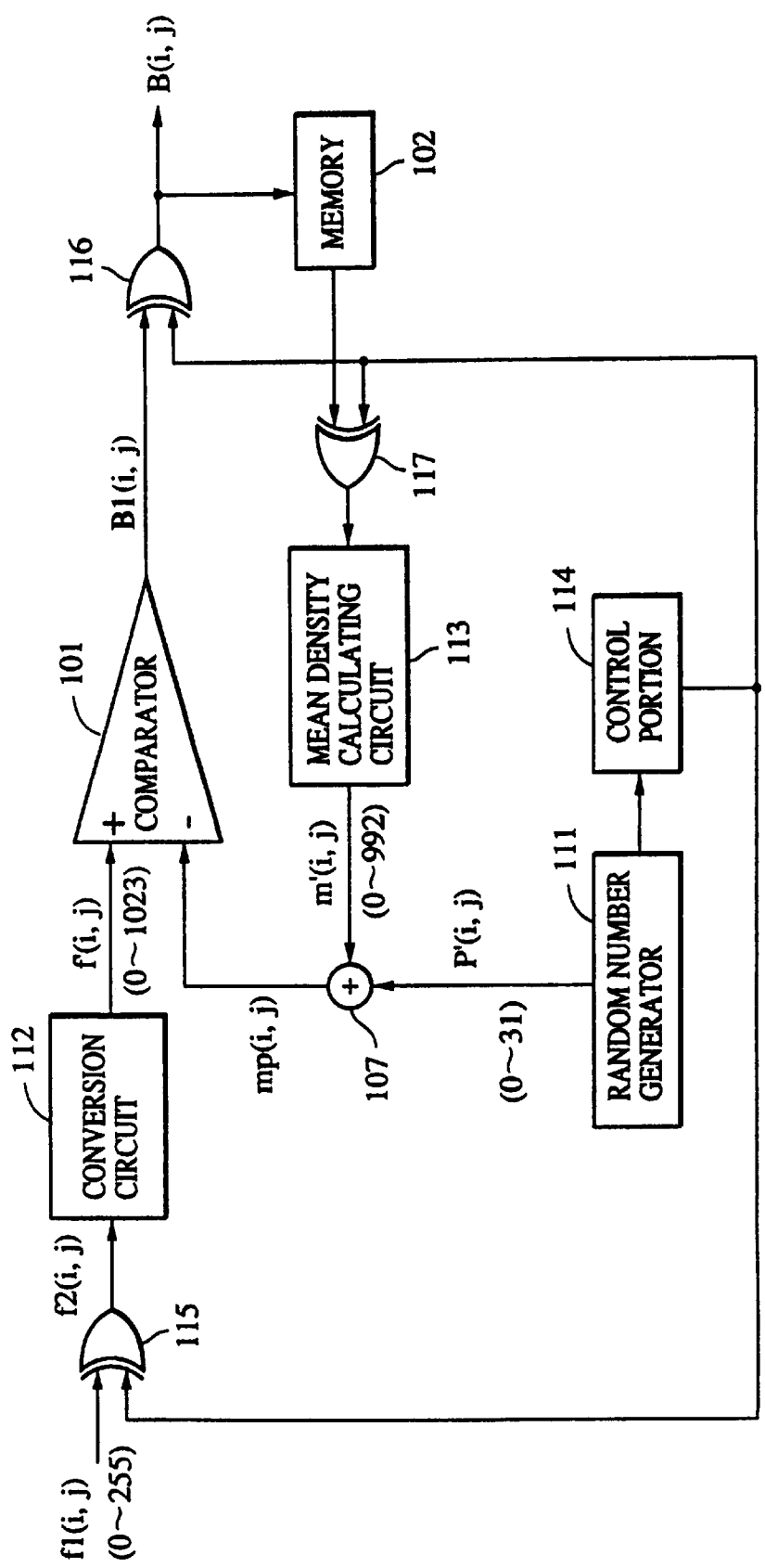
FIG. 17 is a block diagram showing a binary-coding circuit according to an eleventh embodiment of the present invention.

Referring to FIG. 17, the same or equivalent blocks to those shown in FIG. 16 are given the same reference numerals and their descriptions are omitted.

Referring to FIG. 17, reference numerals 115, 116 and 117 represent exclusive-OR gates (hereinafter called "EXORs") each having an input which receives output signal (a) from a control unit 114, to be described later. Moreover, the EXOR 115 receives multivalue density data f1 (i, j) of 8-bit input image, the EXOR 116 receives output signal B1 (i, j) from the comparator 101, and the EXOR 117 receives an output signal from the memory 102. The control unit 114 receives an output signal from the random number generator 111 to transmit the foregoing control signal (a). The total sum of the weighting masks corresponding to the binary-coded pixel regions to which a reference is made in the mean density calculating circuit 113 shown in FIG. 17 is 992. The value of the random number to be transmitted from the random number generator 111 to the adder 107 is from 0 to 31.

The operation of the eleventh embodiment will now be described.

Figures 18, 21:
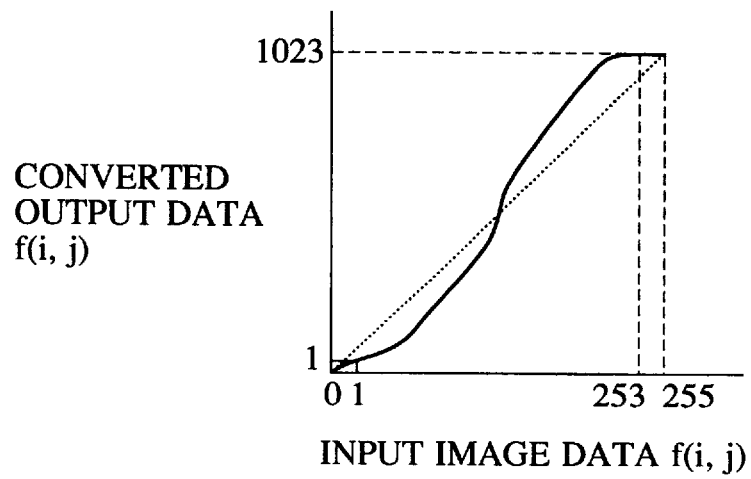
FIG. 18 shows an example of a conversion table according to the eleventh embodiment of the present invention.
FIG. 21 shows an example of the weighting mask.

FIG. 18 shows an example of a conversion table for use in a conversion circuit 112 shown in FIG. 17. The conversion table receives input image data items 253, 254 and 255 and transmits a converted output value 1023. That is, output f' (i, j) from the conversion circuit 112 is 1023. Since the maximum value of the output signals from the adder 107 is 1023 in the case where f' (i, j) is 1023, output B1 (i, j) from the comparator 101 is "1" without exception in accordance with the foregoing Equation (3).

The output signal (a) from the control unit 114 is determined in accordance with a random number signal supplied from the random number generator 111 in such a manner that a high level signal is transmitted at a probability H and a low level signal is transmitted at a probability (1–H).

The case where the level of the output signal (a) is low will now be described. If the level of the output signal (a) from the control unit 114 is low, the EXORs 115, 116 and 117 simply serve as buffers which transmit signals maintaining the polarity of another input signal, which is different from that of the signal (a). Similarly, binary-coded output B (i, j) of input multivalue image data f1 (i, j) is obtained from the output of the EXOR 116.

The case where the output signal (a) from the control unit 114 is high will now be described. In the foregoing case, the input multivalue image data f1 (i, j) is converted into reversal data by the EXOR 15. Specifically, the following operation is performed.

$$f1(i,j) = 0 \rightarrow f2(i,j) = 255$$
$$f1(i,j) = 1 \rightarrow f2(i,j) = 254$$
$$\vdots$$
$$f1(i,j) = 255 \rightarrow f2(i,j) = 0$$

Binary-coded data of pixels, which have been read from the memory 102 and which have been binary-coded, is, by the EXOR 117, reversed and supplied to the mean density calculating circuit 113. As a result, the value of a weighting mask corresponding to a region of pixels, which have been binary-coded and of which binary-coded data is "0", is added so that mean density m' (i, j) is obtained. In the comparator 101, the output signal f' (i, j) from the conversion portion 112 and the output from the adder 107 are subjected to a comparison so that output B1 (i, j) is determined in accordance with the foregoing Equations (12) and (13). The output B1 (i, j) is reversed by the EXOR 16 so that binary-coded output B (i, j) is transmitted.

A specific example of the case where the input multivalue image data is "1" will now be described. If the probability H for determining the level of the signal (a) to be transmitted from the control unit 114 is 0, that is, if the level of the signal (a) is fixed to a low level, the input multivalue image data f1 (i, j) maintaining the value "1" is supplied to the conversion circuit 112. Thus, the conversion table shown in FIG. 18 converts the output f' (i, j) to the value "1". The thus-obtained value and the output signal value from the adder 107 are subjected to a comparison so that binary-coded output B (i, j) is obtained. The number of pixels which output "1" per unit area is large as compared with an ideal value in the case where the ratio of addition of the random number is restrained. The reason for this is that the value of the random number controls the determination of the level of the binary-coded output with respect to input highlight image data. The ratio of addition of the random number is restrained.

If the input multivalue image data f1 (i, j) is "254", the conversion table shown in FIG. 18 converts it into output f' (i, j) having a maximum value of "1023". In the case where the value of f' (i, j) is 1023, the output from the comparator 101 is always "1" in accordance with the Equation (12). Thus, the number of pixels per unit area is large as compared with the ideal value.

The case where the probability H for determining the level of the signal (a) transmitted from the control unit 114 is 1, that is, the case where the level of the signal (a) is high is fixed, will now be described.

If the value of the input multivalue image data f1 (i, j) is "1", the polarity of the data is reversed by the EXOR 115 so that f2 (i, j)=254 is supplied to the conversion circuit 112. The conversion table converts the output f' (i, j) into the value "1023". If the value of f' (i, j) is 1023, the output B1 (i, j) from the comparator 101 is always "1", which is then reversed by the EXOR 116 so that binary-coded output B (i, j) is obtained. In the foregoing case, B (i, j) is always "0" so that the number of pixels per unit area is small as compared with the ideal case. If the input multivalue image data f1 (i, j) is "254", the polarity is reversed by the EXOR 115 so that the value of f2 (i, j) is "1". Also the output f' (i, j) is "1" by the conversion table shown in FIG. 18, "1" being then supplied to the comparator 101. In the foregoing case, the value of the binary-coded output of adjacent binary-coded pixels to be read from the memory 102 is reversed by the EXOR 117 so as to be supplied to the mean density calculating circuit 113. The values of the weighting masks corresponding to the pixels, which output binary-coded value "0", are added so that the mean density m (i, j) is obtained. The mean density m (i, j) is equivalent to that obtainable in the case where a process is performed if f1 (i, j) is "1" in the case where the signal (a) is "0". The thus-obtained output B (i, j) from the comparator 101 is probably "1" as compared with the ideal case if the ratio of addition of the random number is not raised. Therefore, the binary-coded output B (i, j) reversed by the EXOR 116 is probably "0" as compared with the ideal case.

As described above, in the case where the value of the output signal (a) from the control unit 114 is "0" as well as input multivalue image data is "1" or "254", the value of the binary-coded output B (i, j) is "1". Therefore, the number of pixels per unit area is large as compared with the ideal value. If the value of the output signal (a) is "1", the number of pixels is small as compared with the ideal value. In this embodiment, in accordance with the output signal (a) from the control unit 114 the level of which is controlled in accordance with the predetermined probability, switching is performed between the case where the polarity of input multivalue image data is reversed and the case where the same is not reversed. The switching is performed between the process in which the number of pixels per unit area is larger than the ideal value because the value of the binary-coded output B (i, j) is "1" and the process in which the number is smaller than the ideal value. As a result, the ratio of the reversing process and the process in which no reversing process is performed is set to an appropriate ratio. Thus, the number of pixels per unit area, which transmits binary-coded output B (i, j) the value of which is "1", can be controlled.

As a result, the ratio of the reversing process and the process in which the reversing is not performed is set to an appropriate value. Thus, the linearity of binary-coded output data can be improved. Although the description has been performed about the cases where the input multivalue image data is "1" and "254", a similar effect can, of course, be obtained if the input level is another level.

The probability for switching the level of the output signal (a) from the control unit 114 is changed in accordance with the value of input multivalue image data so that the ratio at which the level of the binary-coded output value is "1" is controlled even if the data signals, from which the same output values are obtained from the conversion table, are input. As a result, the necessity of providing the 256-byte conversion table can be eliminated to process 8-bit input image data. Thus, the capacity of the conversion table can be reduced to a fraction.

As described above, the eleventh embodiment has the structure such that the case where the polarity of input multivalue image data is reversed and the case where the same is not reversed are switched in accordance with the output from the random number generator 111 so that the total linearity is improved satisfactorily.

The ratio of addition of the random number p (i, j), the mean density m (i, j) adjacent to a pixel of interest and input image data f (i, j) employed in the tenth and eleventh embodiments is not limited to the foregoing value.

In the foregoing embodiment, the comparison is performed between the value obtained by adding the random number to the obtained mean density adjacent to the pixel of interest and the value in accordance with the input image data. The foregoing process is equivalent to a process in which the mean density is modulated by the random number. If the random number is added to the input image data and the addition of the random number to the mean density adjacent to the pixel of interest is not performed, the present invention may, of course, be adapted.

The configuration and number of the binary-coded pixels to which a reference is made when the mean density m (i, j) adjacent to the pixel of interest is obtained are not limited to those described above.

The embodiment of the present invention will now be described with reference to the drawings.

FIG. 1 is a block diagram showing an image processing apparatus commonly used in the plurality of embodiments to be described later.

Reference numeral 101 represents an input sensor portion having a photoelectric conversion device, such as CCD, and an operation unit for scanning the photoelectric conversion device so as to read and scan an original document. Image data of the original document read by the input sensor portion 101 is sequentially transferred to an A/D converter 102. The A/D converter 102 converts data of each pixel to 8-bit digital data so that quantization is performed to obtain data having 256 gradations. An output signal from the A/D converter 102 is received by a correction circuit 103 so as to be subjected to shading correction for correcting irregular density of the CCD sensor and illuminance realized by an irradiating light source by digital calculations. Then, the processed data is supplied to a binary-coding circuit 104. In the binary-coding circuit 104, the supplied 8-bit multivalue image data is quantized to binary data, such that one bit corresponding to one pixel, by a binary-coding method to be described later in the following embodiments. Reference numeral 105 represents a laser beam or ink jet printer which controls turning a printing dot on/off in accordance with binary data supplied from the binary-coding circuit 104 so as to reproduce an image on recording paper.

The binary-coding circuit 104 shown in FIG. 1 will now be described in the following embodiments.

Twelfth Embodiment

Figure 19:
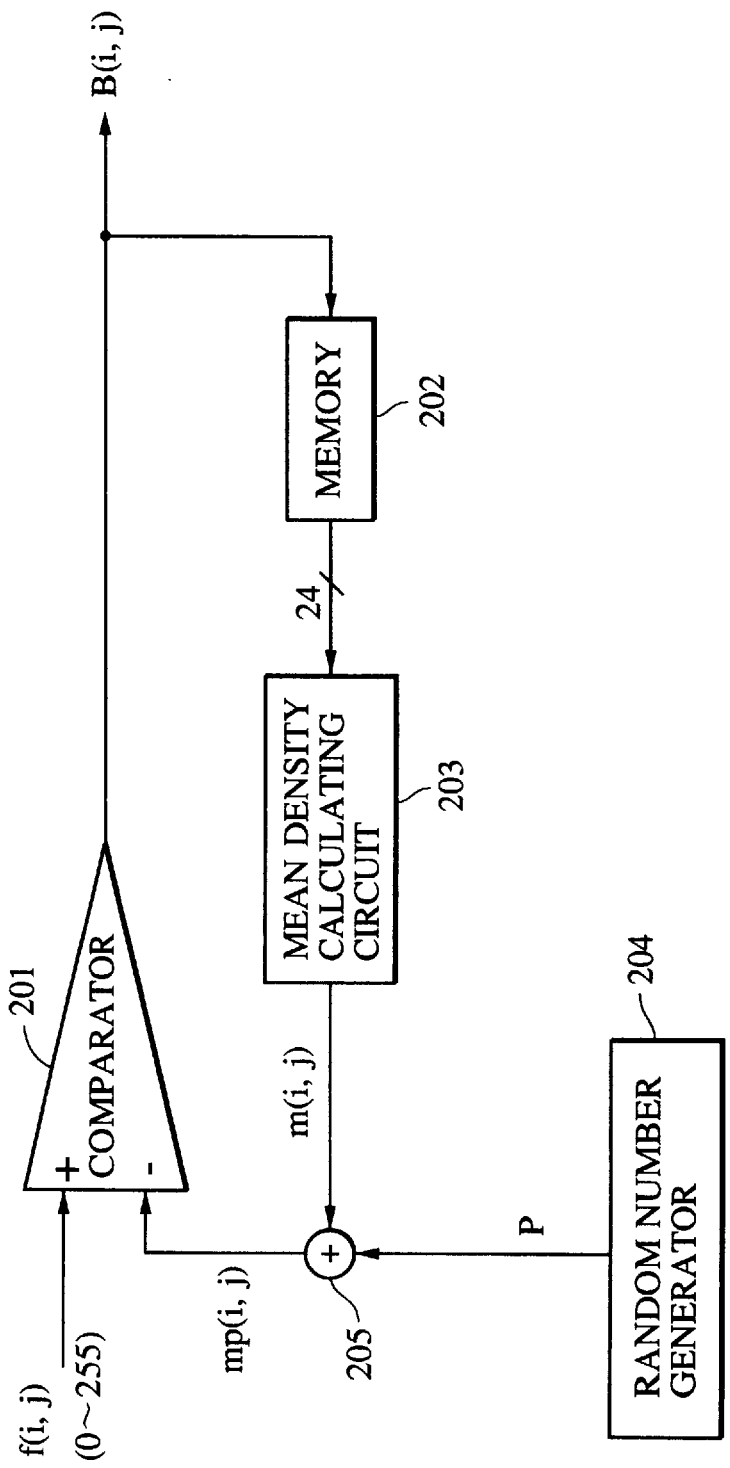
FIG. 19 shows a binary-coding circuit according to a twelfth embodiment of the present invention.

FIG. 19 shows a twelfth embodiment of the present invention. FIG. 19 is a block diagram showing the binary-coding circuit 104. Referring to FIG. 19, f (i, j) represents multivalue density data of an input image intended to be binary-coded, f (i, j) having a value from 0 to 255, 0 of which indicates the lowest density and 255 of which indicates the highest density.

Reference numeral 201 represents a comparator, to which f (i, j) and an output signal mp (i, j) from a adder 205, to be described later, are supplied. The comparator 201 transmits binary-coded image data B (i, j) as a result of the comparison. Reference numeral 202 represents a memory to which binary-coded output B (i, j) is supplied.

Reference numeral 203 represents a mean density calculating circuit which receives a signal read from the memory 202 so as to calculate the mean density m (i, j) adjacent to a pixel of interest in accordance with supplied binary data to transmit the same. Reference numeral 204 represents a random number generator for generating a random number p, the value of which ranges from 0 to 7. Reference numeral 205 represents an adder which adds the random number p transmitted from the random number generator 204 and the output signal m (i, j) from the mean density calculating circuit 203 to transmit a signal mp (i, j) indicating a result of the addition.

FIG. 20 (1) shows configuration of input image data f (i, j) for each pixel. Referring to FIG. 20 (1), f (i, j) indicates multivalue density data of an input image of the position of the pixel of interest intended to be binary-coded. The upper region with respect to a dashed line indicates positions of processed pixels, while the lower region indicates a pixel region to be processed.

FIG. 20 (2) shows binary-coded image data, in which B (i, j) indicates the density (a value 0 or 1) of the binary-coded pixel of interest. The portion above the dashed line indicates binary-coded pixel data when the pixel of interest is processed. The foregoing pixel data has been stored in the memory 202 shown in FIG. 19 to which a reference is made by the mean density calculating circuit 203 shown in FIG. 19 so as to calculate the mean density of a portion adjacent to the pixel of interest. The region lower than the dashed line indicates the position of pixels to be binary-coded.

FIG. 20 (3) shows a weighting mask for use in calculating the mean density, in which R is an example of the weighting mask expressed by a 4×7 matrix. The weight of the position of the pixel of interest is expressed by R (0, 0) such that the value of the weighting mask corresponding to the pixel position which has not been binary-coded is R (0, 0)=R (0, −1)=0. An example of the weighting mask is shown in FIG. 21. The total sum of the values of the weighting masks is set to 248. The value of the mean density m (i, j) to be transmitted from the mean density calculating circuit 203 has a value ranging from 0 to 248, while mp (i, j), which is a result of addition with the output random number p (0 to 7) from the random number generator 204, has a value ranging from 0 to 255.

The operation of this embodiment will now be described.

The memory 202 shown in FIG. 19 stores binary-coded image data, which has been binary-coded with respect to the position of the pixel of interest shown in FIG. 20 (2), such that at least a region for use in calculating the mean density by using the weighting mask shown in FIG. 20 (3) is stored.

The mean density calculating circuit 203 refers to the binary-coded image data stored in the memory 202 to obtain the mean density m (i, j) of a binary image adjacent to the pixel of interest in accordance with the following equation:

$$m(i,j) = \textstyle\sum_{X=-3,0}\sum_{Y=-3,3} R(X,Y) \times B(i+X, j+Y) \qquad (14)$$

The mean density m (i, j) transmitted by the mean density calculating circuit 203 is, in the adder 205, added to the random number p so that mp (i, j) is supplied to the comparator 201. In the comparator 201, mp (i, j) is subjected to a comparison with multivalue input image data f (i, j) so that binary-coded output B (i, j) is obtained in accordance with the following equations:

$$\text{if } f(i,j) > mp(i,j), \text{ or if } f(i,j)=255, \text{ then } B(i,j)=1 \qquad (15)$$

$$\text{if } f(i,j) \leq mp(i,j), \text{ then } B(i,j)=0 \qquad (16)$$

As described above, in accordance with the signal mp (i, j) indicating the result of addition of the mean density m (i, j) calculated from the input multivalue image data f (i, j) and the binary-coded data signal of a portion adjacent to the pixel of interest and the random number signal p to each other, the binary-coded output B (i, j) is obtained.

The value of the random number signal p to be added to the mean density m (i, j) calculated from the binary-coded data signal from the portion adjacent to the pixel of interest determines the smoothness of the gradation in the binary-coded output and the natural image of the binary-coded output in a highlight region. By enlarging the value of the random number signal p and by raising the ratio of addition of the random number, periodic textures and fixed pattern generating in the binary-coded output can be prevented. However, roughness becomes critical in the obtainable binary-coded output image. If the random number p is made to be 3 bits (0 to 7), some roughness is generated but periodic textures and fixed patterns generating in a binary-coded output can be prevented. As a result, a relatively satisfactory output image can be obtained.

Thirteenth Embodiment

Figure 22:
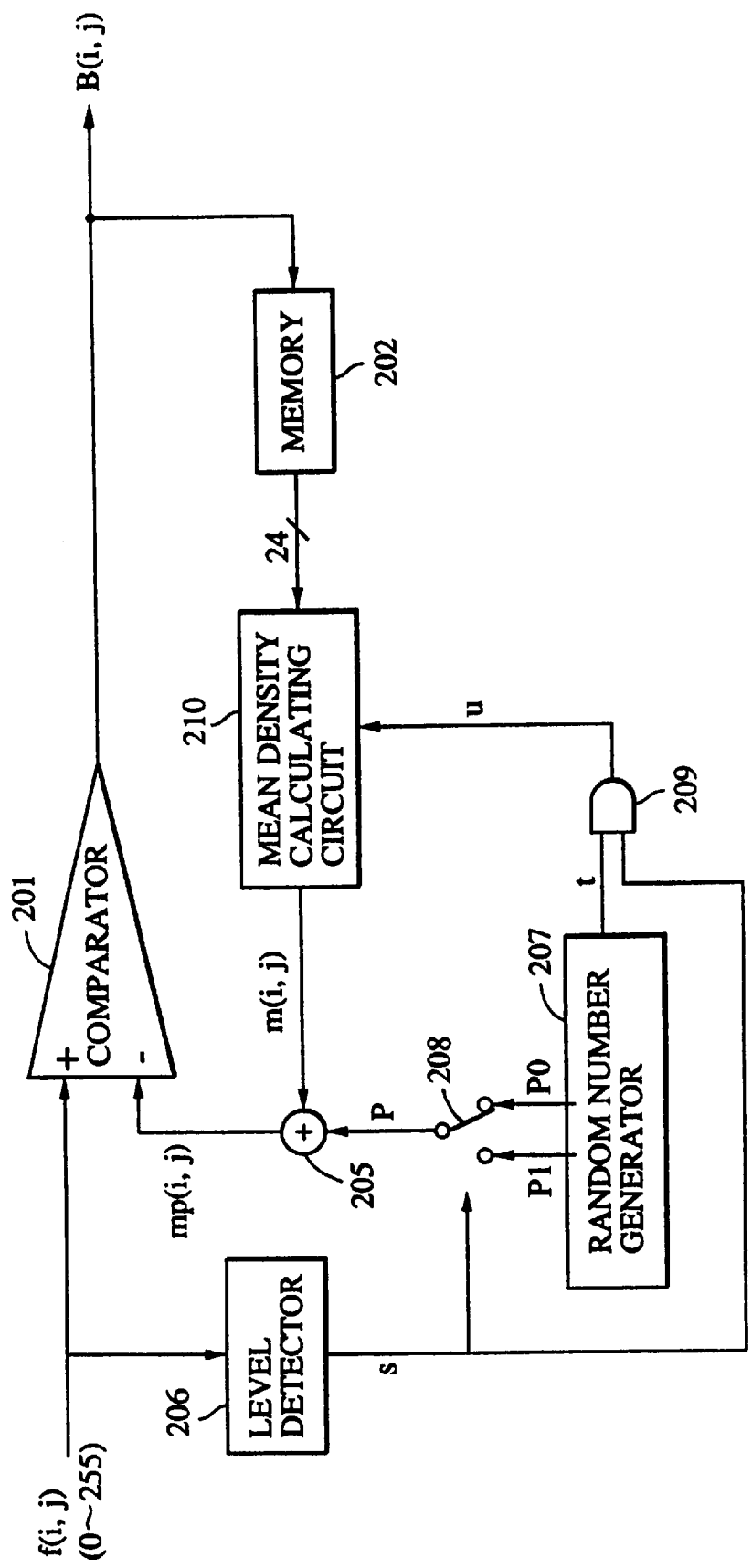
FIG. 22 shows a binary-coding circuit according to a thirteenth embodiment of the present invention.

FIG. 22 is a block diagram showing a binary-coding circuit according to a thirteenth embodiment.

The same blocks as those shown in FIG. 19 are given the same reference numerals and their descriptions are omitted.

Referring to FIG. 22, reference numeral 206 represents a level detector for detecting the level of input image data f (i, j). When f (i, j)<32, the level detector 206 transmits, to a switch 208 and an AND gate 209, signal s="1", the level detector 206 transmitting s="0" when f (i, j) is at another level.

Reference numeral 207 represents a random number generator which transmits, to the switch 208, 2-bit random number p0 (0 to 3) and 3-bit random number p1 (0 to 7). The random number generator 207 transmits, to the AND gate 209, 1-bit random number t (0 to 1). The switch 208 is controlled in response to output signal s from the level detector 206. When s=1, the switch 208 selects p0. When s=0, the switch 208 selects p1. The selected random number is supplied to an adder 205.

If s=0, that is, if f (i, j)≦32, then random number p1 having a 3-bit value ranging from 0 to 7 is selected by the switch 208 so as to be added to the mean density. If s=1, that is, if f (i, j)<32, then random number p0 having a 2-bit value ranging from 0 to 3 is selected as the random number to be added. As a result, roughness and periodic generation of textures in a highlight region can be prevented.

Figure 23:
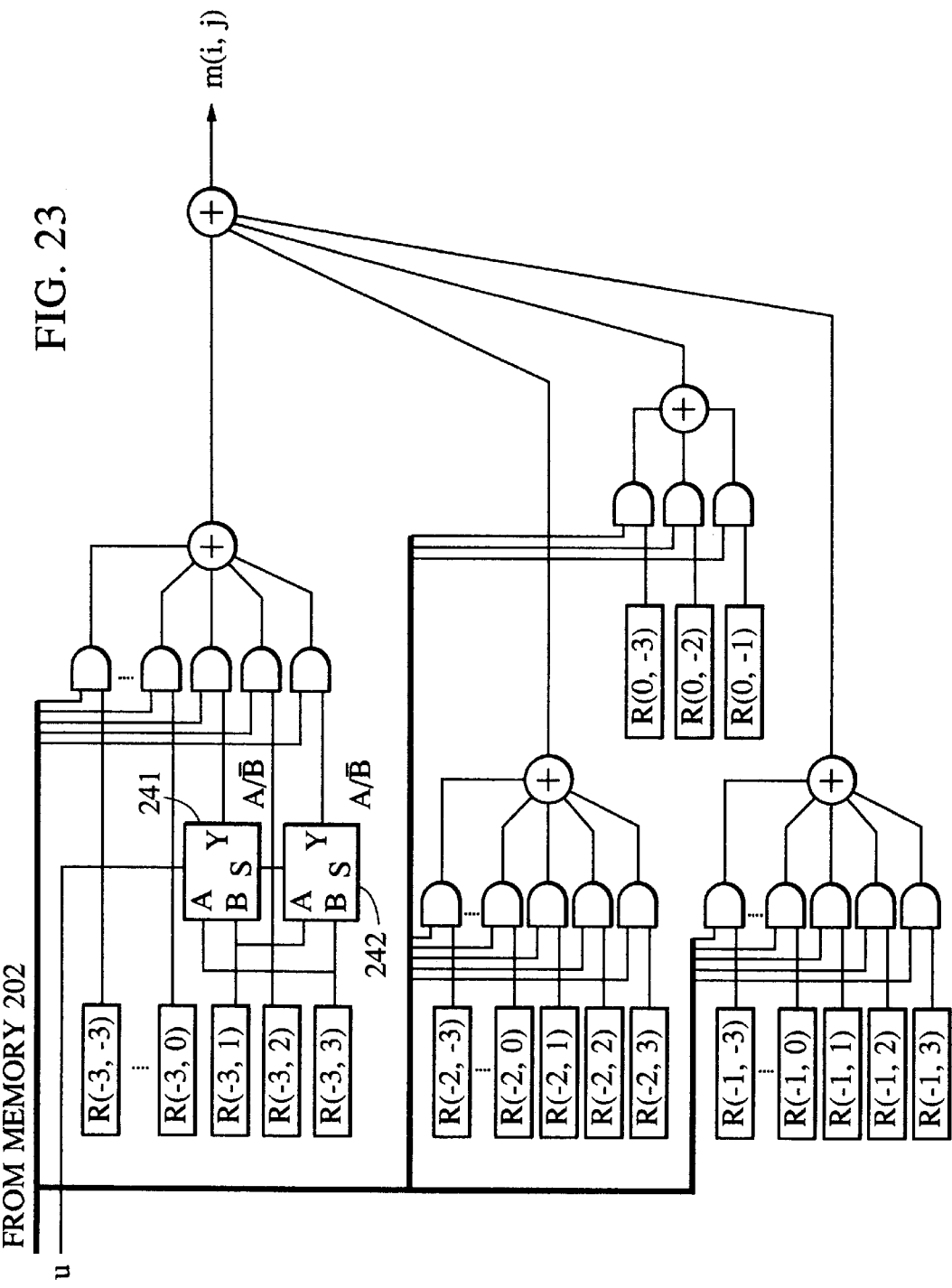
FIG. 23 shows a mean density calculating circuit according to the thirteenth embodiment of the present invention.

A detailed block diagram of the mean density calculating circuit 210 shown in FIG. 22 is shown in FIG. 23. A weighting mask similar to that shown in FIG. 20 (3) and FIG. 21 is employed. Selectors 241 and 242 to be controlled in response to output signal u from the AND gate 209 replace the values R (−3, 1) and R (−3, 3) of the weighting masks if u=1 so that the mean density is obtained.

An output pattern of binary-coded output B (i, j) corresponding to a multivalue input image data f (i, j) will now be described.

Figure 24:
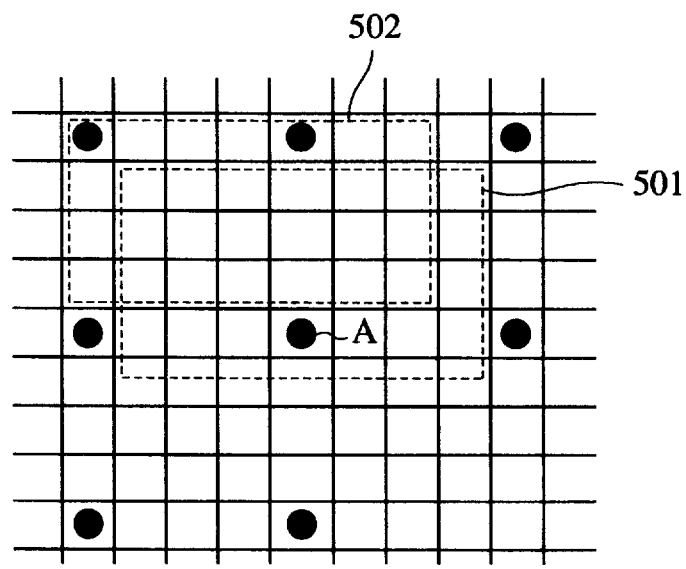
FIGS. 24 and 25 show the process according to the thirteenth embodiment.

In the case where f (i, j)=0, B (i, j) is always 0 in accordance with the foregoing Equation (16). In the case where f (i, j)=1 to 3, the mean density m (i, j)=0 and the mp (i, j) is the value of the random number p when the weighting mask pattern shown in FIG. 20 (3) is moved to a position corresponding to position 501 as shown in FIG. 24. Thus, random number p0 from 0 to 3 determines the binary-coded output value from the interest pixel position A.

In the case where (i, j)=4 and the random number t is always "0", a fixed pattern is transmitted such that only one pixel among 16 pixels is B (i, j)=1 as shown in FIG. 24.

The reason for this will now be described. If the weighting mask pattern shown in FIG. 20 (3) is moved to the position corresponding to the position 501 as shown in FIG. 24, the mean density m (i, j) is always 0 and mp (i, j) is the value 0 to 3 of the random number p0. Therefore, the foregoing Equation (15) is held and therefore B (i, j) is 1. If the weighting mask is at another position and the mean density is lowest, the weighting mask exists at the position 502. Since the mean density m (i, j) is "7" in the foregoing case, B (i, j) is 0 because of Equation (15). Therefore, a pattern which outputs binary code "1" cannot be generated if the weighting mask is not located at the position 501.

In the twelfth embodiment, the random number p to be added to the mean density is 0 to 7 so that the mean density m (i, j) is 0 to 7 even if the weighting mask is located at the position 501. As a result, B (i, j) is not always 1 so that generation of a fixed pattern is prevented.

Random number t to be transmitted from the random number generator 207 is, through the AND gate 209, formed into signal u. Therefore, if s="1", the values of the weighting masks are replaced by the selectors 241 and 242 shown in FIG. 23. If u="1", then the values R (−3, 1)=6 and R (−3, 3)=1 of the weighting masks are replaced by the selectors 241 and 242 so that the calculation shown in Equation (14) is performed to obtain the mean density m (i, j). As a result, the mean density m (i, j) in the case where the weighting mask is located at position 601 shown in FIG. 25, at a probability of ½, has a value m (i, j)=7 or 2 in accordance with the value of u.

If the random number p is 0 or 1 in the case where m (i, j)=2, the binary-coded output of the input image data f (i, j)=4 is B (i, j)=1.

Figure 25:
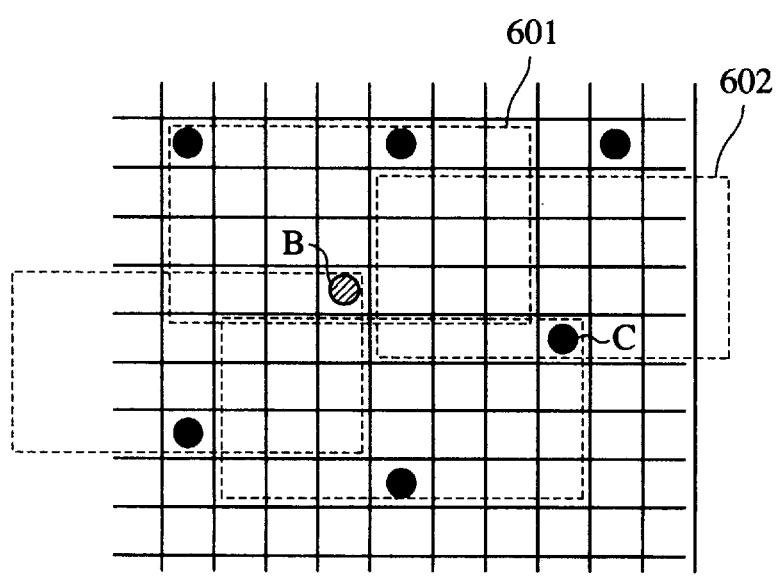

Since the random number p has a value 0 to 3, the probability that p=0 or 1 is ½. Therefore, the binary-coded output of the position of interest pixel B shown in FIG. 25 is "1" with a probability of ¼. As a result, the fixed pattern of binary-coded output data is disordered so that binary-coded data of the pixel position shown in C of FIG. 25 is "1" hereinafter.

Figure 26:
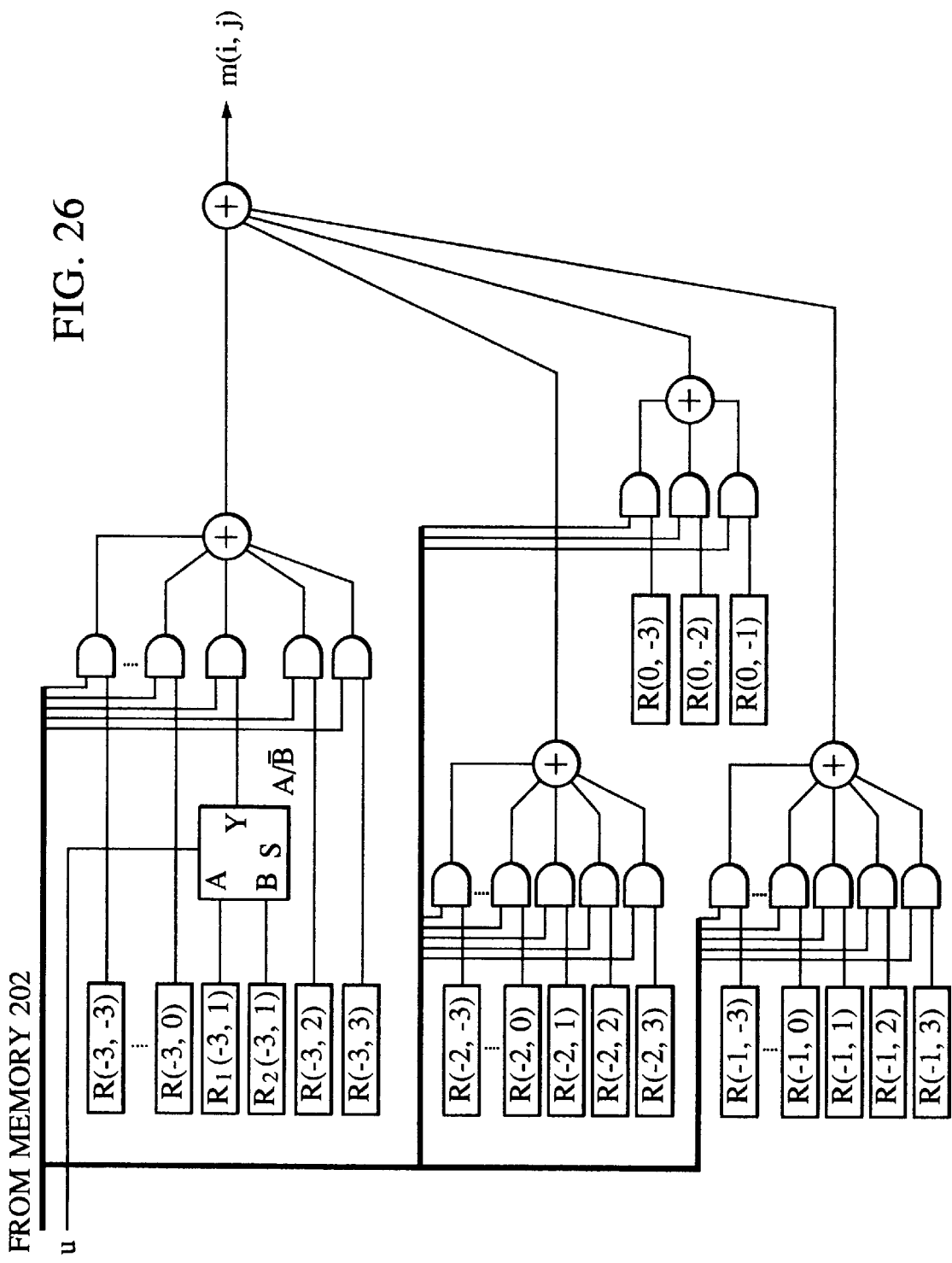
FIG. 26 shows a mean density calculating circuit according to a modification of the thirteenth embodiment of the present invention.

Although the embodiment shown in FIG. 23 has the structure comprising the step of replacing the value of the weighting mask, another embodiment capable of attaining a similar effect is shown in FIG. 26. In this embodiment, the value of the weighting mask R (−3, 1) is selected from "6" or "1" in accordance with u. Similar to the foregoing embodiment, an effect of disordering the fixed pattern of the binary-coded output data can be obtained.

The positions, at which the value of the weighting mask is changed, are not limited to the positions R (−3, 1) and R (−3, 3). If the weighting mask at another position is changed, a similar effect can be obtained.

Although the description has been performed about the case where the input image data f (i, j) is "4", a case where binary-coded output data "1" results in a fixed pattern will now be described. If input level f (i, j)=11, then a pattern shown in FIG. 27 can easily be generated. If input level f (i, j)=21, then a pattern shown in FIG. 28 can easily be generated. With respect to another input level, pixels, which output binary-coded output "1", can easily appear at the pixel position at which the mean density determined in accordance with the configuration of the values of the weighting masks is low. By changing the value of the weighting mask at the pixel position corresponding to the fixed pattern, which can easily be generated, generation of the fixed pattern can be prevented. Thus, the configuration of pixels which output binary-coded value "1" can be made natural.

By reducing the random number to be added as described above, the fixed pattern and periodic generations of textures in the binary-coded output can be prevented by changing the values of the weighting masks.

Since the random number is made to be small, roughness in a highlight region can be prevented.

Fourteenth Embodiment

Figure 27:
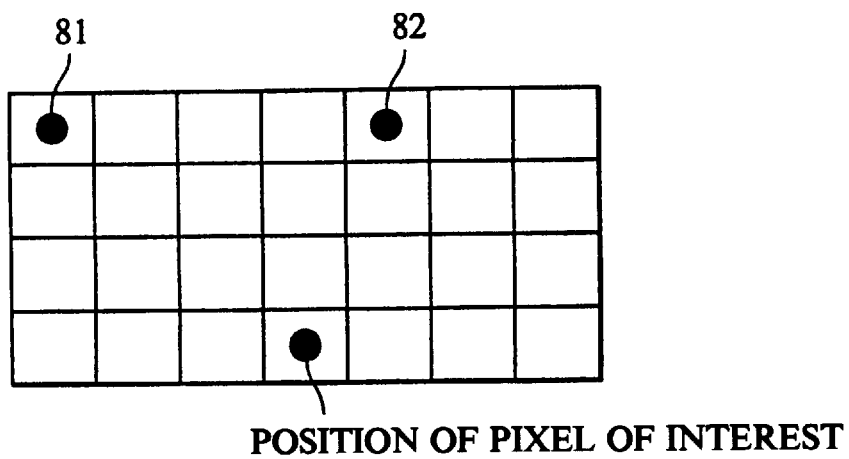
FIGS. 27 and 28 show a process according to a fourteenth embodiment of the present invention.
Figure 28:
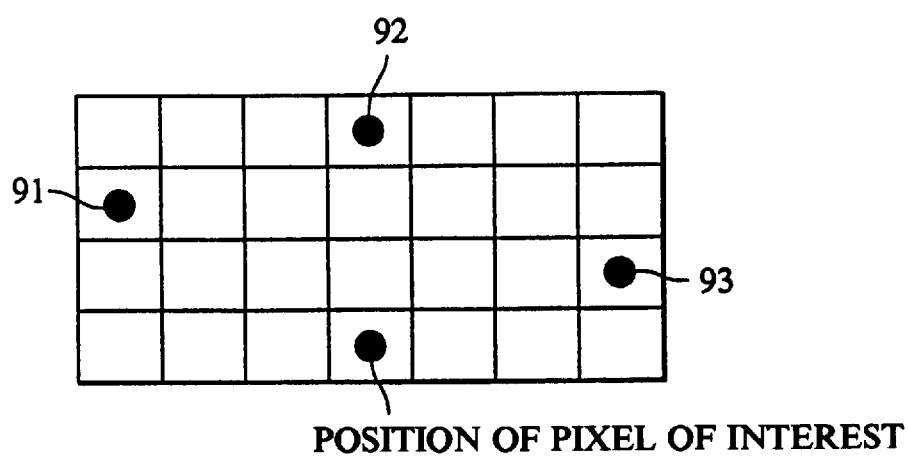

A fourteenth embodiment for preventing generation of a fixed pattern shown in FIGS. 27 and 28 will now be described.

Figure 29:
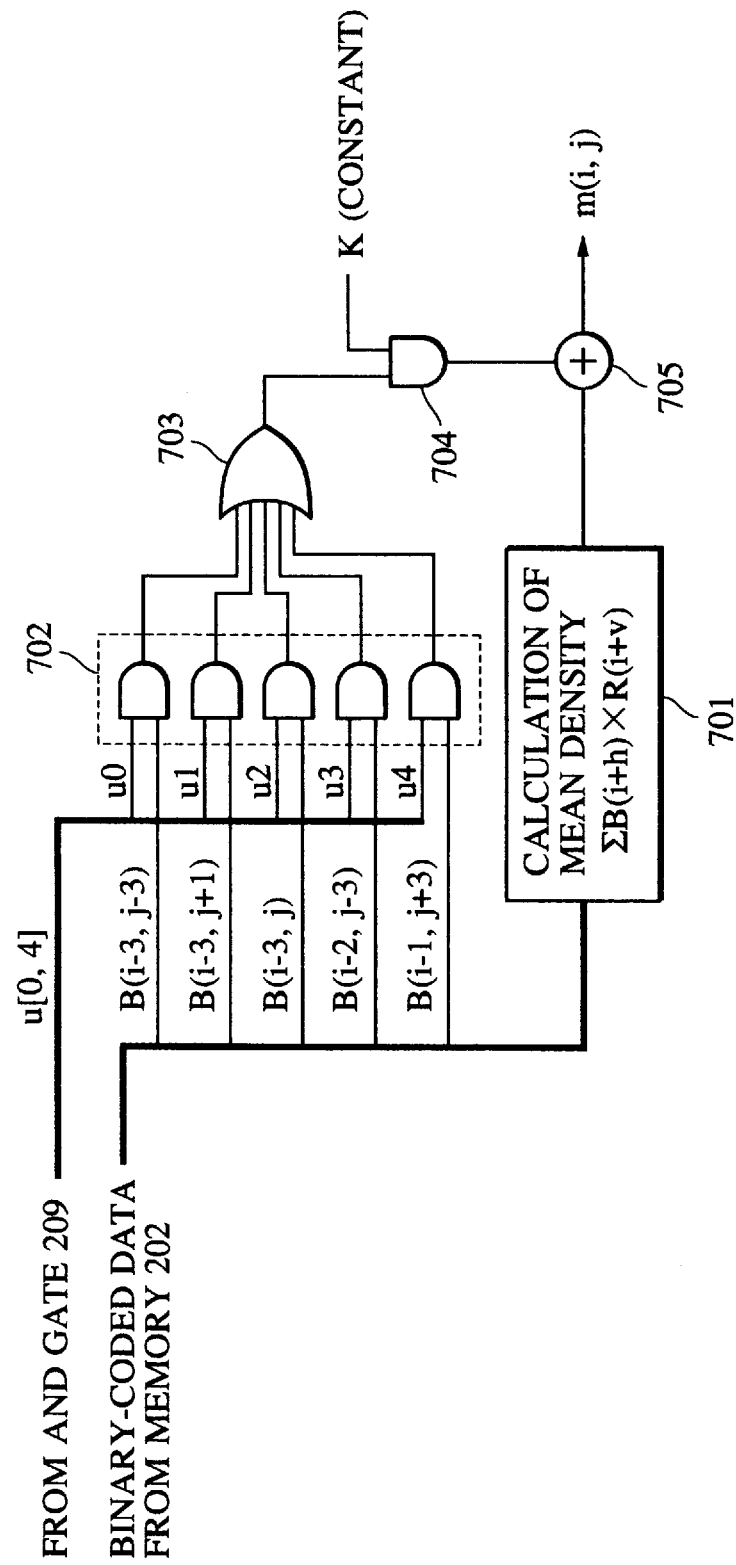
FIG. 29 shows a mean density calculating circuit according to the fourteenth embodiment of the present invention.

The structure of this embodiment is arranged in such a manner that the mean density calculating circuit 210 shown in FIG. 22 is formed into that shown in FIG. 29 and other blocks are the same.

Referring to FIG. 29, reference numeral 701 represents a block for calculating the mean density in accordance with Equation (14). Random number t to be transmitted from the random number generator 207 is 5-bit random number t (0, 4), while an AND gate 209 corresponding to the random number generator 207 transmits output u (0, 4). Each bit of u (0, 4) and data of pixel positions 81, 82, 91, 92 and 93 corresponding to the binary-coded data "1" except the pixel of interest in the pattern shown in FIGS. 27 and 28 are supplied to an AND gate 702. If the output from the AND gate 702 is "1", an OR gate 703 outputs "1" so that constant K is supplied to an adder 705 through an AND gate 704. The mean density calculated by the mean density calculating block 701 in accordance with Equation (14) is supplied to the adder 705. Then, a result of addition with the output from the AND gate 704 is, as m (i, j), transmitted to the adder 205. As a result, if each of the binary-coded outputs from the positions 81, 82, 91, 92 and 93, which are the pixel position of the fixed pattern shown in FIGS. 27 and 28 is "1" and the corresponding bit of the random number t (0, 4) is "1", the mean density is enlarged by the constant K. Thus, the binary-coded output value of the interest pixel position is made to be "0". As a result, the binary-coded output of the pixel of interest, which is always "1" if the constant K is not added, is made to be "0" so that generation of a fixed pattern is prevented.

Fifteenth Embodiment

A fifteenth embodiment for preventing the fixed pattern shown in FIGS. 27 and 28 will now be described.

Figure 30:
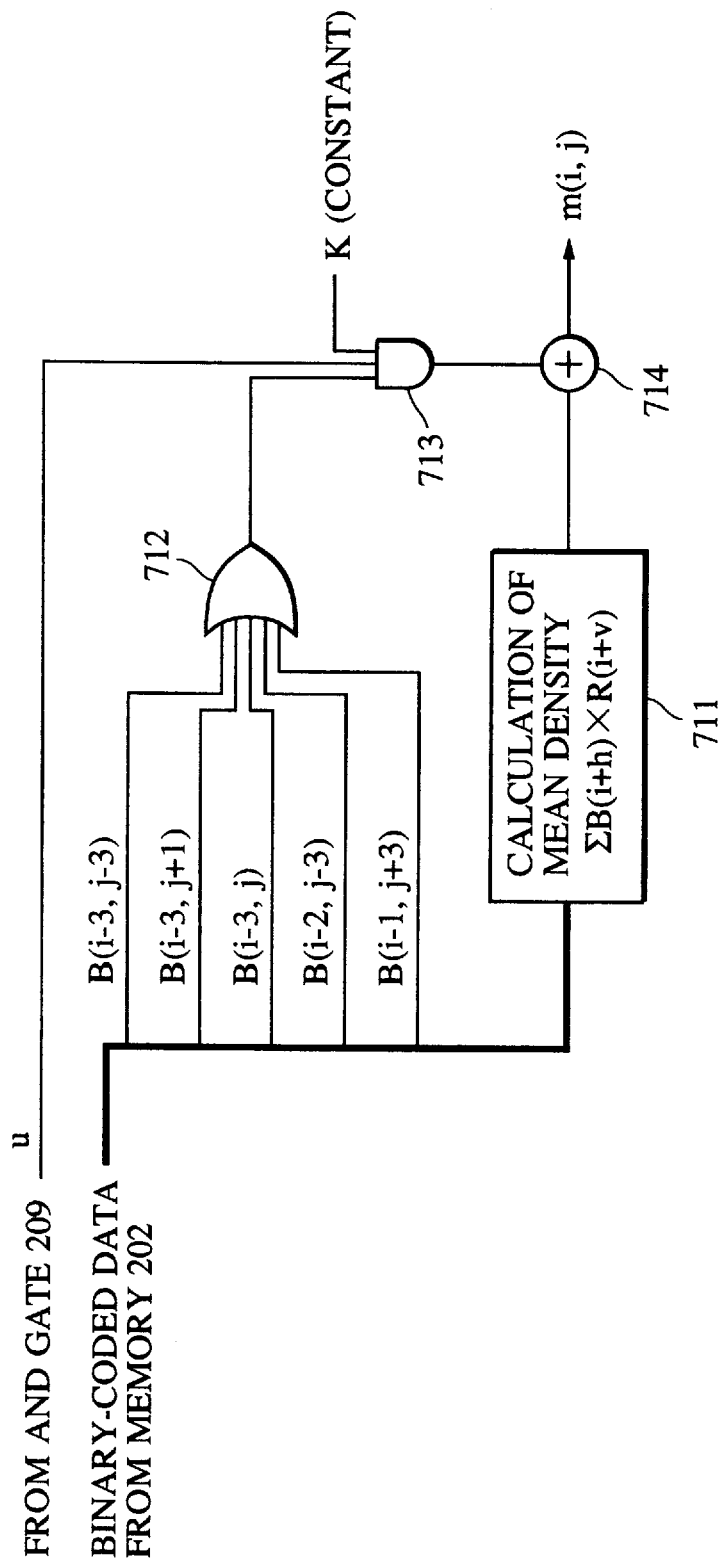
FIG. 30 shows a mean density calculating circuit according to a fifteenth embodiment of the present invention.

The structure of this embodiment is arranged in such a manner that the mean density calculating circuit 210 shown in FIG. 22 is formed into a structure shown in FIG. 30 and other blocks are the same.

Referring to FIG. 30, reference numeral 711 represents a block for calculating the mean density in accordance with Equation (14). Symbol u represents an output of 1-bit random number t transmitted from the random number generator 204 through the AND gate 209, the output u being then supplied to an AND gate 713. In the patterns shown in FIGS. 27 and 28, data items of pixel positions 81, 82, 91, 92 and 93 corresponding to binary-coded data "1" except the pixel of interest are supplied to an OR gate 712. In the case where the OR gate 712 outputs "1" and u is "1", constant K is, through an AND gate 713, supplied to an adder 714. The mean density calculated in the block 711 is supplied to the adder 714 so that a result of addition with an output from the AND gate 713 is, as m (i, j), transmitted to the adder 205. As a result, if any binary-coded output of the positions 81, 82, 91, 92 and 93, which are the pixel positions of the fixed patterns shown in FIGS. 27 and 28 is "1" and u is "1", the mean density is raised by the constant K. Therefore, the value of the binary-coded output of the interest pixel position is made to be "0 ". Thus, the binary-coded output of the pixel of interest, which is always "1" if the constant K is not added, is "0" so that generation of a fixed pattern is prevented.

The positions, at which the values of the weighting masks are replaced in the thirteenth to fifteenth embodiments, are not limited to the foregoing positions. The positions may be changed in accordance with the pixel positions corresponding to the fixed pattern generating in a binary-coded output image.

In the foregoing embodiment, the constant K is added to the mean density to prevent generation of binary-coded output "1" when a specific pattern is output. The constant K may be subtracted when another pattern is output to cause the binary-coded output to easily be "1". In the foregoing case, a similar effect can be obtained.

The region and value of the weighting mask are not limited to those described above. Although the thirteenth to fifteenth embodiments have the structure such that the value of the random number to be added to the mean density is changed in such a manner that the input image density value 32 is employed as the border, the structure is not limited to this. The foregoing process may be performed for the overall range of the input image densities. However, if the density of the input image data is raised, pixels, which output binary-coded outputs "1", are generated as well as at the pixel positions shown in FIG. 27 or 28. In the foregoing case, binary-coded output "1" can be prevented in the case where pixel, which outputs binary code "1", exists at the pixel position shown in FIG. 27 or 28. Thus, periodic generation of textures are prevented. If textures are generated periodically in a high density region, the image quality is not considerably affected. Therefore, in the case where pixels, which output binary-coded value "1", are generated at pixel positions shown in FIG. 28, the replacement or change of the values of the weighting masks, or change of the mean density is performed in only a highlight region in which pixels, which output binary-coded output "1", are not substantially generated at other pixel positions so that the quality of the output image is most effectively improved.

As described above, according to the thirteenth to fifteenth embodiments of the present invention, a satisfactory half tone image exhibiting excellent gradation characteristics can be obtained at high speed with a very simple structure without a necessity of performing error correction. In particular, since the means for changing the mean density is provided, generation of undesirable fixed pattern in a binary-coded output image can be prevented even if the random number to be added to the mean density is reduced. As a result, the random number to be added to the mean density can be reduced and roughness appearing in a highlight region of a binary-coded output image can be prevented. Simultaneously, an effect can be obtained in that a satisfactory half tone output image exhibiting excellent gradation expressing characteristic can be obtained without generation of a fixed pattern.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. An image processing apparatus comprising:
    input means for inputting multivalue image data;
    calculating means for calculating a mean density in a predetermined region;
    random number generating means for generating random number data;
    synthesizing means for, at a predetermined ratio, synthesizing the mean density obtained from said calculating means and the random number data obtained from said random number generating means; and binary-coding means for binary-coding the multivalue image data in such a manner that the value obtained from said synthesizing means is used as a threshold, wherein said synthesizing means changes the ratio of synthesizing the mean density and the random number data in accordance with a level of the multivalue image data input by said input means.

2. An image processing apparatus according to claim 1, wherein said input means includes conversion means for converting input/output characteristics of the input multivalue image data.

3. An image processing apparatus comprising:

input means for inputting multivalue image data;

calculating means for calculating a mean density in a predetermined region;

random number generating means for generating random number data;

synthesizing means for, at a predetermined ratio, synthesizing the mean density obtained from said calculating means and the random number data obtained from said random number generating means; and binary-coding means for binary-coding the multivalue image data in such a manner that the value obtained from said synthesizing means is used as a threshold, wherein said calculating means calculates the mean density in accordance with binary data of a pixel region, which has been binary-coded by said binary-coding means, and multivalue image data of a pixel region, which has not been binary-coded, and wherein said calculating means binary-codes the multivalue image data of the pixel region, which has not been binary-coded, by using a dither threshold and calculates the mean density in accordance with binary data obtained by the binary-coding process.

4. An image processing apparatus comprising:

input means for inputting multivalue image data;

calculating means for calculating a mean density in a predetermined region;

random number generating means for generating random number data;

synthesizing means for, at a predetermined ratio corresponding to a level of the input multivalue image data, synthesizing the mean density obtained from said calculating means and the random number data obtained from said random number generating means; and binary-coding means for binary-coding the multivalue image data in such a manner that the value obtained from said synthesizing means is used as a threshold, wherein said synthesizing means raises the ratio of addition of the random number data when the level of the multivalue image data approaches from half tone to a lowest density or a highest density.

5. An image processing apparatus comprising:

input means for inputting multivalue image data;

conversion means for converting input/output characteristics of the input multivalue image data;

calculating means for calculating a mean density in a predetermined region;

random number generating means for generating random number data;

synthesizing means for, at a predetermined ratio, synthesizing the mean density obtained from said calculating means and the random number data obtained from said random number generating means;

binary-coding means for binary-coding the multivalue image data converted by said conversion means in such a manner that the value obtained from said synthesizing means is used as a threshold; and control means for switching between a mode in which a conversion process is performed by said conversion means, and a mode in which the conversion process is not performed.

6. An image processing apparatus comprising:

input means for inputting multivalue image data;

conversion means for converting input/output characteristics of the input multivalue image data, wherein said conversion means reverses density data of the input multivalue image data;

calculating means for calculating a mean density in a predetermined region;

random number generating means for generating random number data;

synthesizing means for, at a predetermined ratio, synthesizing the mean density obtained from said calculating means and the random number data obtained from said random number generating means; and binary-coding means for binary-coding the multivalue image data converted by said conversion means in such a manner that the value obtained from said synthesizing means is used as a threshold.

7. An image processing apparatus comprising:

input means for inputting multivalue image data;

calculating means for calculating a mean density in a predetermined region;

random number generating means for generating random number data;

binary-coding means for binary-coding the multivalue image data in accordance with the mean density obtained from said calculating means and random number data obtained from said random number generating means; and changing means for changing the mean density, wherein said calculating means calculates the mean density in accordance with binary data of pixels in a predetermined region and coefficient values corresponding to positions of the pixels, and said changing means changes the coefficient values to change the mean density.

8. An image processing apparatus according to claim 7, wherein said changing means changes the coefficient values in accordance with a pattern of binary data of a region around a pixel of interest to change the mean density.

9. An image processing apparatus comprising:

input means for inputting multivalue image data;

calculating means for calculating a mean density in a predetermined region;

random number generating means for generating random number data;

binary-coding means for binary-coding the multivalue image data in accordance with the mean density obtained from said calculating means and random number data obtained from said random number generating means; and changing means for changing the mean density, wherein said changing means changes the mean density to raise the mean density in accordance with the value of binary data of a region around a pixel of interest.

10. An image processing apparatus comprising:

input means for inputting multivalue image data;

calculating means for calculating a mean density in a predetermined region;

random number generating means for generating random number data;

binary-coding means for binary-coding the multivalue image data in accordance with the mean density obtained from said calculating means and random number data obtained from said random number generating means; and changing means for changing the mean density, wherein said changing means changes the mean density in accordance with binary data of a region around a pixel of interest and a predetermined generation probability.

11. An image processing method comprising the steps of:

an inputting step for inputting multivalue image data;

a calculating step for calculating a mean density in a predetermined region;

a random number generating step for generating random number data;

a synthesizing step for, at a predetermined ratio, synthesizing the mean density obtained in said calculating step and the random number data obtained in said random number generating step, where said synthesizing step includes changing the ratio of synthesizing the mean density and the random number data in accordance with a level of the multivalue image data input by said input means; and a binary-coding step for binary-coding the multivalue image data in such a manner that a value obtained in said synthesizing step is used as a threshold.

12. An image processing method comprising the steps of:

an inputting step for inputting multivalue image data;

a calculating step for calculating a mean density in a predetermined region;

a random number generating step for generating random number data;

a synthesizing step for synthesizing the mean density obtained in said calculating step and the random number data obtained in said random number generating step at a ratio corresponding to a level of the input multivalue image data, where said synthesizing step includes raising the ratio of addition of the random number data when the level of the multivalue image data approaches from half tone to a lowest density or a highest density; and a binary-coding step for binary-coding the multivalue image data in such a manner that a value obtained in said synthesizing step is used as a threshold.

13. An image processing method comprising the steps of:

an inputting step for inputting multivalue image data;

a switching step for switching between a first mode and a second mode;

a conversion step for converting input/output characteristics of the input multivalue image data, where said conversion step is performed when the first mode is set, and said conversion step is not performed when the second mode is set;

a calculating step for calculating a mean density in a predetermined region;

a random number generating step for generating random number data;

a synthesizing step for synthesizing the mean density obtained in said calculating step and the random number data obtained in said random number generating step at a predetermined; and a binary-coding step for binary-coding the multivalue image data converted in said conversion step in such a manner that a value obtained in said synthesizing step is used as a threshold.

14. An image processing method comprising the steps of:

an inputting step for inputting multivalue image data;

a calculating step for calculating a mean density in a predetermined region;

a random number generating step for generating random number data;

a binary-coding step for binary-coding the multivalue image data in accordance with the mean density obtained in said calculating step and the random number data obtained in said random number generating step; and a changing step for changing the mean density, wherein said calculating step includes calculating the mean density in accordance with binary data of pixels in a predetermined region and coefficient values corresponding to positions of the pixels, and said changing steps includes changing the coefficient values to change the mean density.

15. An image processing method according to claim 14, wherein said changing step includes changing the coefficient values in accordance with a pattern of binary data of a region around a pixel of interest to change the mean density.

16. An image processing method comprising the steps of:

inputting multivalue image data;

calculating a mean density in a predetermined region;

generating random number data;

binary-coding the multivalue image data in accordance with the mean density calculated in said calculating step and the random number data generated in said generating step; and changing the mean density to raise the mean density in accordance with the value of binary data of a region around a pixel of interest.

17. An image processing method comprising the steps of:

inputting multivalue image data;

calculating a mean density in a predetermined region;

generating random number data;

binary-coding the multivalue image data in accordance with the mean density calculated in said calculating step and the random number data generated in said generating step; and changing the mean density in accordance with binary data of a region around a pixel of interest and a predetermined generation probability.

18. An image processing method comprising the steps of:

inputting multivalue image data;

calculating a mean density in a predetermined region;

generating random number data;

synthesizing, at a predetermined ratio, the mean density calculated in said calculating step and the random number data generated in said generating step; and binary-coding the multivalue image data in such a manner that the value synthesized in said synthesizing means is used as a threshold;

calculating the mean density in accordance with binary data of a pixel region, which has been binary-coded in said binary-coding step, and multivalue image data of a pixel region, which has not been binary-coded; and binary-coding the multivalue image data of the pixel region, which has not been binary-coded, by using a dither threshold and calculating the mean density in accordance with binary data coded in said binary-coding step.

19. An image processing method comprising the steps of:

inputting multivalue image data;

converting input/output characteristics of the input multivalue image data, wherein said conversion step reverses density data of the input multivalue image data;

calculating a mean density in a predetermined region;

generating random number data;

synthesizing, at a predetermined ratio, the mean density calculated in said calculating step and the random number data generated in said generating step; and binary-coding the multivalue image data converted in said converting step in such a manner that the value synthesized in said synthesizing step is used as a threshold.

* * * * *

UNITED STATES PATENT AND TRADEMARK OFFICE
CERTIFICATE OF CORRECTION

PATENT NO. : 5,825,940

DATED : October 20, 1998

INVENTOR(S): SHIGEO YAMAGATA ET AL.

It is certified that error appears in the above-identified patent and that said Letters Patent is hereby corrected as shown below:

COLUMN 1

Line 18, "75DIGEST" should read --75 DIGEST--.

COLUMN 4

Line 36, "according" should read --according to a first--.

COLUMN 7

Line 5, "$SU_{(Xx0,2,)}$" should read --$SU_{(X=0,2,)}$--.

COLUMN 10

Line 51, "number" should read --numbers--.

COLUMN 12

Line 13, "$su_{(Y-1,1,)}$" should read --$su_{(Y=-1,1,)}$--.

COLUMN 13

Line 47, "output" should read --outputs--.

COLUMN 14

Line 12, "0.," should read --0,...,--.

UNITED STATES PATENT AND TRADEMARK OFFICE
CERTIFICATE OF CORRECTION

PATENT NO. : 5,825,940

DATED : October 20, 1998

INVENTOR(S): SHIGEO YAMAGATA ET AL.

It is certified that error appears in the above-identified patent and that said Letters Patent is hereby corrected as shown below:

COLUMN 17

Line 1, "mask" should read --masks--;
Line 33, delete "by using";
Line 52, "as well as" should read --also--;
Line 65, "being" should be deleted.

COLUMN 18

Line 49, delete "into binary data by".

COLUMN 19

Line 28, "a" should read --an--;
Line 59, "matrix 3X3" should read --3X3 matrix--.

COLUMN 20

Line 44, "Then, the" should read --The--.

COLUMN 21

Line 41, "generating" should read --generated--.

COLUMN 27

Line 15, "generating" should read --generated--.

UNITED STATES PATENT AND TRADEMARK OFFICE
CERTIFICATE OF CORRECTION

PATENT NO. : 5,825,940

DATED : October 20, 1998

INVENTOR(S): SHIGEO YAMAGATA ET AL.

It is certified that error appears in the above-identified patent and that said Letters Patent is hereby corrected as shown below:

COLUMN 28

Line 4, "held" should read --satisfied--.

COLUMN 30

Line 5, "generating" should read --generated--;
Line 24, "where" should read --where a--;
Line 50, "characteristic" should read --characteristics--.

COLUMN 34

Line 4, "predetermined" should read --predetermined ratio--;
Line 27, "steps" should read --step--.

Signed and Sealed this

Fourth Day of January, 2000

*Attest:*

*Attesting Officer*   Acting Commissioner of Patents and Trademarks